United States Patent
Yano

(10) Patent No.: US 10,930,186 B2
(45) Date of Patent: Feb. 23, 2021

(54) IMAGE DISPLAY APPARATUS AND IMAGE DISPLAY ELEMENT

(71) Applicant: SONY CORPORATION, Tokyo (JP)

(72) Inventor: Tomoya Yano, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/491,096

(22) PCT Filed: Feb. 26, 2018

(86) PCT No.: PCT/JP2018/006891
§ 371 (c)(1),
(2) Date: Sep. 4, 2019

(87) PCT Pub. No.: WO2018/180094
PCT Pub. Date: Oct. 4, 2018

(65) Prior Publication Data
US 2020/0020262 A1    Jan. 16, 2020

(30) Foreign Application Priority Data
Mar. 27, 2017 (JP) .............................. JP2017-061198

(51) Int. Cl.
*G09G 3/02* (2006.01)
*G02B 5/02* (2006.01)
*G02B 5/32* (2006.01)

(52) U.S. Cl.
CPC .............. *G09G 3/02* (2013.01); *G02B 5/021* (2013.01); *G02B 5/0278* (2013.01); *G02B 5/0284* (2013.01); *G02B 5/32* (2013.01)

(58) Field of Classification Search
None
See application file for complete search history.

(56) References Cited

U.S. PATENT DOCUMENTS

| 5,288,803 A | 2/1994 | Yukawa et al. |
| 2002/0027678 A1 | 3/2002 | Halldorsson et al. |

(Continued)

FOREIGN PATENT DOCUMENTS

| CN | 105301888 A | 2/2016 |
| DE | 19704740 A1 | 8/1998 |

(Continued)

OTHER PUBLICATIONS

International Search Report and Written Opinion of PCT Application No. PCT/JP2018/006891, dated May 22, 2018, 11 pages of ISRWO.

*Primary Examiner* — Duane N Taylor, Jr.
(74) *Attorney, Agent, or Firm* — Chip Law Group

(57) ABSTRACT

Provided are an image display apparatus and an image display element that are capable of achieving excellent visual effects. The image display apparatus of the present invention includes a first transparent member, a second transparent member, and an emission section. The first transparent member includes a diffusion surface for diffusing light incident on respective points. The second transparent member includes a control surface and is integrated with the first transparent member, the control surface being disposed in a manner that the control surface faces the diffusion surface, controlling propagation directions of light diffused at the respective points on the diffusion surface, and forming a virtual image of the diffusion surface. The emission section emits image light to the diffusion surface.

18 Claims, 11 Drawing Sheets

(56) References Cited

U.S. PATENT DOCUMENTS

| | | | |
|---|---|---|---|
| 2008/0297866 A1* | 12/2008 | Endo | G02B 27/0103 359/13 |
| 2010/0259727 A1* | 10/2010 | Nagayoshi | G03B 21/2013 353/20 |
| 2013/0201081 A1* | 8/2013 | Evans | G02B 27/017 345/8 |
| 2015/0362742 A1 | 12/2015 | Yoneno et al. | |
| 2016/0004077 A1* | 1/2016 | Yanagisawa | B60K 35/00 359/633 |
| 2017/0227764 A1 | 8/2017 | Kim et al. | |

FOREIGN PATENT DOCUMENTS

| | | |
|---|---|---|
| EP | 0958521 B1 | 11/1999 |
| EP | 1070984 A1 | 1/2001 |
| JP | 11-202417 A | 7/1999 |
| JP | 2001-183605 A | 7/2001 |
| JP | 2002-508848 A | 3/2002 |
| JP | 2003-015229 A | 1/2003 |
| JP | 2003-121944 A | 4/2003 |
| JP | 2012-150291 A | 8/2012 |
| JP | 2016-001211 A | 1/2016 |
| TW | 497000 B | 8/2002 |
| WO | 98/35260 A1 | 8/1998 |
| WO | 00/46637 A1 | 8/2000 |

\* cited by examiner

IMAGE DISPLAY APPARATUS AND IMAGE DISPLAY ELEMENT

CROSS REFERENCE TO RELATED APPLICATIONS

This application is a U.S. National Phase of International Patent Application No. PCT/JP2018/006891 filed on Feb. 26, 2018, which claims priority benefit of Japanese Patent Application No. JP 2017-061198 filed in the Japan Patent Office on Mar. 27, 2017. Each of the above-referenced applications is hereby incorporated herein by reference in its entirety.

TECHNICAL FIELD

The present technology relates to image display apparatuses and image display elements.

BACKGROUND ART

Conventionally, technologies of projecting image light on a transparent screen or the like and displaying an image have been developed. For example, by projecting image light on a transparent screen through which a background and the like can be seen, it is possible to display an image in a manner that the image overlaps with the background.

Patent Literature 1 describes a hologram screen that is capable of displaying images while a background and can be seen through the hologram screen. According to Patent Literature 1, the hologram screen scatters, diffuses, and emits video light incident from a video projection apparatus. This makes it possible to provide observers with the video displayed on the hologram screen together with objects installed behind the hologram screen. (See paragraphs [0002], [0045], [0046], FIG. 1, and the like of Patent Literature 1).

CITATION LIST

Patent Literature

Patent Literature 1: JP 2003-121944A

DISCLOSURE OF INVENTION

Technical Problem

The technologies of displaying images by using the transmissive screen or the like is expected to be applied to wide fields such as amusement, advertising, and healthcare. Technologies capable of achieving excellent visual effects have been desired.

In view of the circumstances as described above, a purpose of the present technology is to provide an image display apparatus and an image display element that are capable of achieving excellent visual effects.

Solution to Problem

To achieve the above-described purpose, an image display apparatus according to an embodiment of the present technology includes a first transparent member, a second transparent member, and an emission section.

The first transparent member includes a diffusion surface for diffusing light incident on respective points.

The second transparent includes a control surface and that is integrated with the first transparent member, the control surface being disposed in a manner that the control surface faces the diffusion surface, controlling propagation directions of light diffused at the respective points on the diffusion surface, and forming a virtual image of the diffusion surface.

The emission section emits image light to the diffusion surface.

The image display apparatus includes the first transparent member and the second transparent member that are integrated with each other, and emits image light to the diffusion surface of the first transparent member. The control surface of the second transparent member controls propagation directions of the image light diffused at the respective points on the diffusion surface, and forms a virtual image of the diffusion surface. This makes it possible to achieve excellent visual effects.

The control surface may control the propagation directions at least by diffracting, refracting, or reflecting the diffused light.

This makes it possible to easily control the propagation directions of light through a diffraction phenomenon or the like. As a result, it is possible to achieve excellent visual effects by using the simple apparatus.

The control surface may collect at least a portion of the diffused light in a focus of the control surface.

This makes it possible to accurately control the propagation directions of the image light on the basis of the focus, for example. As a result, it is possible to form a high-quality virtual image and achieve excellent visual effects.

The diffusion surface may diffuse the light incident on the respective points on the diffusion surface at predetermined incident angles.

For example, this makes it possible to diffuse light having a predetermined incident angle and transmit light having incident angles other than the predetermined incident angle. This makes it possible to achieve a highly transparent screen or the like.

The diffusion surface may diffuse the light in a predetermined angular range.

This makes it possible to control a light diffusion range and suppress unnecessary diffusion and the like. As a result, it is possible to form a virtual image with high accuracy and achieve excellent visual effects.

The predetermined angular range may be set on the basis of angular dependency of diffraction efficiency of the control surface.

For example, by setting an angular range of diffusion of light to a range of high diffraction efficiency, quantity of the image light to form the virtual image is increased, and it is possible to provide a bright image.

At least one of the first transparent member or the second transparent member may be a holographic optical element.

This makes it possible to achieve the transparent members having a desired function by using the holographic optical element, and this makes it possible to provide various kinds of visual effects.

The first transparent member may be a reflective holographic optical element. In this case, the diffusion surface may diffuse and reflect the light incident on the respective points.

This makes it possible to configure the apparatus in accordance with a usage environment, an installation position, and the like of the apparatus, for example, and this makes it possible to provide excellent visual effects in various circumstances.

The first transparent member may be a transmissive holographic optical element. In this case, the diffusion surface may diffuse and transmit the light incident on the respective points.

This makes it possible to provide excellent visual effects in various circumstances.

The second transparent member may be a reflective holographic optical element. In this case, the control surface may have an optical function as a plane mirror or a concave mirror.

This makes it possible to provide excellent visual effects in various circumstances.

The second transparent member may be a transmissive holographic optical element. In this case, the control surface may have an optical function as a lens.

This makes it possible to provide excellent visual effects in various circumstances.

The first transparent member and the second transparent member may be disposed in a manner that the first transparent member and the second transparent member are substantially parallel to each other at a shorter interval than a focal length of the control surface.

This makes it possible to easily form a virtual image with a desired size at a desired display position, for example. In addition, it is possible to achieve desired visual effects.

The diffusion surface may have an optical function as a field lens that controls diffusion directions of the light diffused at the respective points.

This makes it possible for the diffusion surface to diffuse light in conformity with the size and the like of the control surface, for example. As a result, quantity of the image light to form the virtual image is increased, and it is possible to provide a bright image.

The first transparent member and the second transparent member may be held via transparent material interposed between the first transparent member and the second transparent member.

This makes it possible to sufficiently prevent deviation of a positional relation between the first transparent member and the second transparent member, and this makes it possible to improve reliability of the transparent screen or the like.

The first transparent member and the second transparent member may have stacking structures corresponding to respective wavelengths of R, G, and B.

This makes it possible to display a full-color image and the like.

The emission section may include a laser light source.

This makes it possible to accurately control the propagation directions and the like of the image light. As a result, it is possible to form a high-quality virtual image and achieve excellent visual effects.

The first transparent member may have a cylindrical shape. In this case, the second transparent member may be disposed in a manner that the second transparent member surrounds a central axis of the cylindrical shape and faces at least one of an inner periphery or an outer periphery of the cylindrical shape.

For example, this makes it possible to form a cylindrical virtual image and display a whole circumference image. As a result, it is possible to achieve excellent visual effects.

The emission section may emit the image light from an inside of the cylindrical shape to an outside of the cylindrical shape.

This makes it possible to reduce the size of the apparatus.

An image display element according to an embodiment of the present technology includes a first transparent member and a second transparent member.

The first transparent member includes a diffusion surface for diffusing light incident on respective points.

The second transparent member includes a control surface and that is integrated with the first transparent member, the control surface being disposed in a manner that the control surface faces the diffusion surface, controlling propagation directions of light diffused at the respective points on the diffusion surface, and forming a virtual image of the diffusion surface.

Advantageous Effects of Invention

As described above, according to the present technology, it is possible to achieve the excellent visual effects. Note that, the effects described herein are not necessarily limited and may be any of the effects described in the present disclosure.

MODE(S) FOR CARRYING OUT THE INVENTION

Hereinafter, embodiments of the present technology will be described with reference to the drawings.

First Embodiment

[Configuration of Image Display Apparatus]

Figure 1:
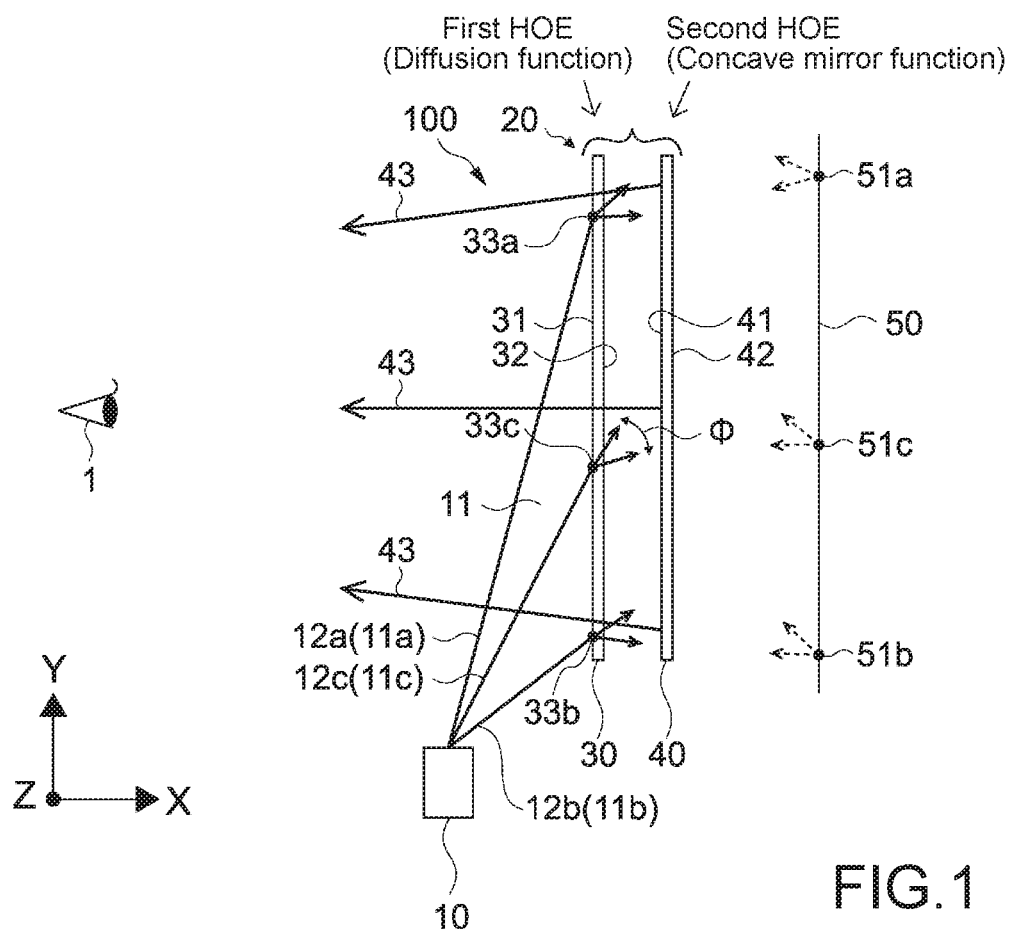
FIG. 1 is a schematic diagram illustrating a configuration example of an image display apparatus according to a first embodiment of the present technology.

FIG. 1 is a schematic diagram illustrating a configuration example of an image display apparatus according to a first embodiment of the present technology. An image display apparatus 100 includes an emission section 10 and a screen unit 20. As illustrated in FIG. 1, with regard to the image display apparatus 100, image light 11 emitted from the emission section 10 is incident on the screen unit 20, and is emitted from a front side (image display side) of the screen unit 20. The image light 11 constitutes an image. It is possible for an observer to visually recognize the image and the like by seeing the front side of the screen unit 20.

In this embodiment, XYZ coordinates are set in a manner that an X direction represents a thickness direction of the screen unit 20, and a YZ plane direction represents a direction in which the screen unit 10 extends, the direction being perpendicular to the thickness direction.

The emission section 10 is disposed at a lower front side (left side) of the screen unit 20. The emission section 10 emits the image light 11 toward the screen unit 20. The emission section 10 is capable of emitting the image light 11 in a predetermined emission angle range (angle of view). FIG. 1 schematically illustrates an upper side optical path 12a, a lower side optical path 12b, and a middle optical path 12c. The upper side optical path 12a extends toward a position above the screen unit 20. The lower side optical path 12b extends toward a position below the screen unit 20. The middle optical path 12c is interposed between the upper side optical path 12a and the lower side optical path 12b. Note that, an installation position of the emission section 10 is not limited.

The emission section 10 includes a laser light source capable of emitting laser light having a predetermined wavelength. The image light 11 includes coherent light (laser light) that has high coherence. As the emission section 10, it is possible to use a liquid crystal panel, a projector that includes a digital micromirror device (DMD), or the like, for example. A specific configuration of the emission section 10 is not limited. For example, a small mobile projector (pico projector), or the like may be appropriately used in accordance with the size, use application, and the like of the image display apparatus 100. Alternatively, it is also possible to use any device or mechanism capable of emitting the image light 11.

The screen unit 20 includes a first holographic optical element (HOE) 30 and a second HOE 40. The first HOE 30 and the second HOE 40 are integrated with each other. In this embodiment, the screen 20 corresponds to an image display element.

The HOE is an optical element (holographic optical element) using a holography technology. For example, the HOE is capable of achieving various optical functions such as light diffusion and optical path control by diffracting light through a prerecorded interference pattern. For example, it is possible to allow angular selectivity for diffusing light having predetermined incident angles and transmitting light having incident angles other than the predetermined incident angles. In this embodiment, the first HOE 30 and the second HOE 40 function as transparent optical elements having the angular selectivity.

The first HOE 30 has a plate-like shape, and includes a first surface 31 and a second surface 32 opposite to the first surface 31. On the first surface 31, the image light 11 emitted from the emission section 10 is incident. The first HOE 30 is disposed in a manner that respective plane directions of the first surface 31 and the second surface 32 are parallel to the YZ plane direction. In addition, the first HOE is disposed in a manner that the first surface 31 faces the front side (left side) of the screen unit 20.

In this embodiment, a transmissive holographic optical element (HOE) is used as the first HOE 30. The transmissive holographic optical element (HOE) diffuses and transmits light incident on the first surface 31. As illustrated in FIG. 1, the first HOE 30 diffuses the image light 11 incident on respective points on the first surface 31 and emits the diffused light from the second surface 32. In other words, the first HOE 30 has a property of diffusing and transmitting light incident at incident angles, on the basis of the incident angle of the image light 11 emitted from the emission section 10 to the respective points on the first surface 31.

The light incident on the respective points on the first surface 31 at different incident angles pass through the first HOE 30 as it is. For example, light or the like perpendicularly incident on the first surface 31 passes through the first surface 31 without being diffused. Therefore, transparency of the first HOE 30 is not damaged.

In addition, the first surface 31 (the first HOE 30) diffuses the image light 11 incident on the respective points on the first surface 31 in a predetermined angular range $\Phi$. For example, the predetermined angular range $\Phi$ is set in accordance with angular dependency and the like of diffraction efficiency of the second HOE 40. Details thereof will be described later. Note that, it is also possible to appropriately set emission directions, and the like of the diffused image light 11.

FIG. 1 schematically illustrates an example in which image light 11a, image light 11b, and image light 11c are respectively pass through the upper side optical path 12a, the lower side optical path 12b, and the middle optical path 12c, are incident on incident points 33a, 33b, and 33c on the first surface 31, and are diffused in the predetermined angular range $\Phi$.

In this embodiment, the first surface 31 corresponds to a diffusion surface for diffusing light incident on respective points, and the first HOE 30 corresponds to a first transparent member. Note that, an installation position, an area, and the like of the surface (diffusion surface) for diffusing light are not limited. For example, it is possible to appropriately configure the diffusion surface in accordance with a recording position and the like of the interference pattern.

The second HOE 40 has a plate-like shape, and is integrated with the first HOE 30 via a holding mechanism (not illustrated). The second HOE 40 includes a third surface 41 that faces the first HOE 30, and a fourth surface 42 opposite to the third surface 41. The second HOE 40 and the first HOE 30 are disposed in a manner that they are substantially parallel to each other at a predetermined interval. Note that, the predetermined interval is set in a manner that the predetermined interval is shorter than a focal length f (to be described later).

In this embodiment, a reflective holographic optical element (HOE) is used as the second HOE 40. The reflective holographic optical element (HOE) diffracts light incident on the third surface 41 toward the light incident side (left side). In addition, the second HOE is appropriately configured in a manner that the third surface 41 has an optical function as a concave mirror.

The third surface 41 controls propagation directions of the image light diffused at the respective points on the first surface of the first HOE 30, and forms a virtual image of the first surface 31. In this embodiment, the third surface 41 reflects (diffracts) the image light 11 diffused at the respective incident points 33a to 33c on the diffusion surface (the first surface 31). This makes it possible to form virtual images 51a to 51c of the respective incident points 33a to 33c on an image formation plane 50 that is across the reflection surface (the third surface 41) from the first surface 31.

FIG. 1 schematically illustrates image light 43 that forms the virtual images. The image light 43 that forms the virtual images is emitted from the third surface 41 toward a point of view 1 of the observer. At the point of view 1 of the observer, the image light 43 that forms the virtual images is observed as if the light were emitted from the virtual images 51a to 51c or the like of the respective incident point (dotted arrows in FIG. 1). This makes it possible for the observer to visually recognize the virtual images formed on the image formation plane 50.

In addition, the third surface 41 includes an optical axis and a focus. For example, the virtual image of the first surface 31 is formed on the image formation plane 50 that is orthogonal to the optical axis. The virtual image of the first surface 31 has a size corresponding to a focal length. The direction of the optical axis, the focal position, and the like of the third surface 41 are not limited. For example, a desired optical axis, a desired focus, and the like may be appropriately set in accordance with the use application and the like of the image display apparatus 100.

In this embodiment, the third surface 41 corresponds to a control surface, and the second HOE 40 corresponds to a second transparent member. Note that, an installation position, an area, and the like of the control surface are not limited. For example, it is possible to appropriately configure the control surface in accordance with a recording position and the like of the interference pattern.

Figure 2:
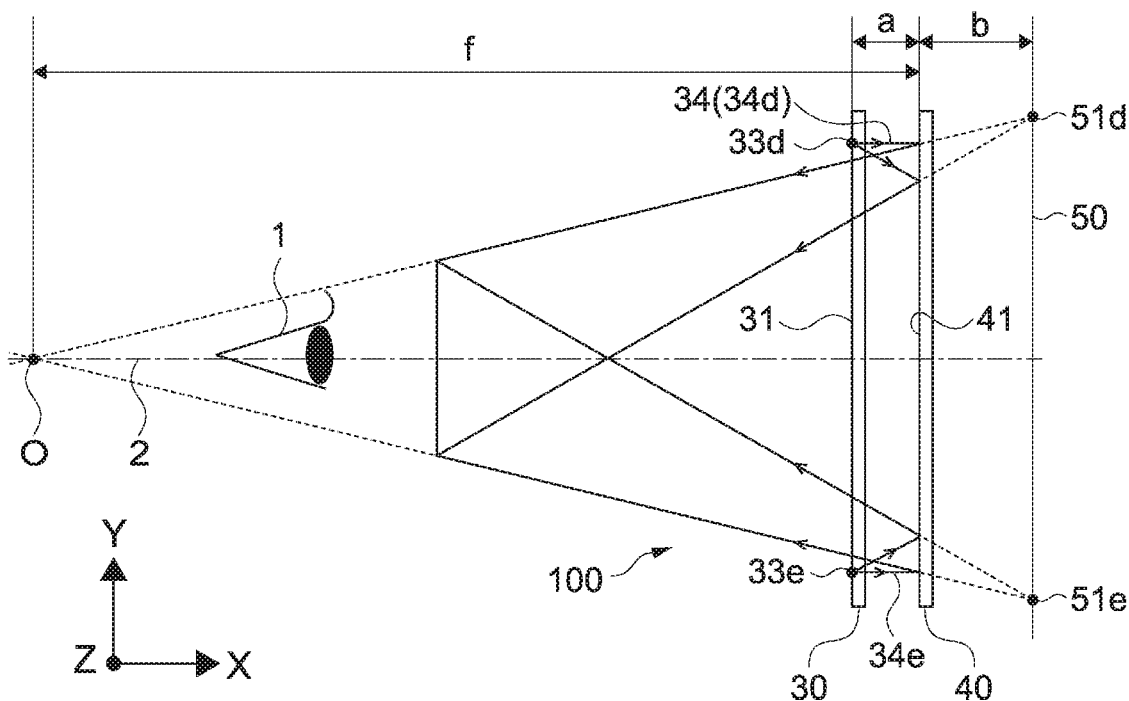
FIG. 2 is a schematic diagram for describing an optical property of the image display apparatus.

FIG. 2 is a schematic diagram for describing optical properties of the image display apparatus 100. FIG. 2 illustrates an optical axis 2 and a focus O of the second HOE 40. Note that, the emission section 10 is omitted in FIG. 2.

The first surface 31 of the first HOE 30 diffuses the image light 11 incident on the respective points in a predetermined angular range, and emits diffused light 34. FIG. 2 schematically illustrates diffused light 34d and diffused light 34e emitted from an upper side incident point 33d and the lower side incident point 33e.

The diffused light 34 passes through the first HOE 30, and is emitted toward the third surface 41 of the second HOE 40. In other words, the first surface 31 functions as a screen that displays an image toward the third surface 41. Note that, the diffused light 34 emitted from the first surface 31 is not emitted to the side of the point of view 1 of the observer. Therefore, the observer does not visually recognize an image displayed on the first surface 31.

The third surface 41 reflects (diffracts) the diffused light 34 that has been incident on the third surface 41, and forms virtual images of the respective points of the first surface 31. In addition, the diffused and reflected light 34 passes through the first HOE 30, and is emitted toward the point of view 1 of the observer. FIG. 2 schematically illustrates a virtual image 51d of the upper side incident point 33d and a virtual image 51e of the lower side incident point 33e. The virtual images 51d and 51e are formed on the image formation plane 50.

For example, the diffused light 34d emitted from the upper side incident point 33d is reflected by the third surface 41 along an optical path based on a focus. Specifically, the light emitted from the incident point 33d in a direction parallel to the optical axis O is reflected along an optical path connecting the virtual image 51d of the incident point 33d with the focus O. Light emitted in another direction is reflected along a direction corresponding to its angle.

In a similar way, the diffused light 34e emitted from the lower side incident point 33e is reflected by the third surface 41 along an optical path based on a focus. In other words, the third surface 41 reflects the diffused light 34 emitted from the respective points on the first surface 31, in a manner that the parallelly incident light beams are collected in the focus. This makes it possible to form the virtual image on the image formation plane 50. The virtual image is an enlarged image of the image displayed on the first surface 31.

For example, the position of the image formation plane 50 on which the virtual image is formed is represented by a virtual image formula listed below.

$$(1/b) = (1/a) - (1/f)$$

Here, b is a distance between the third surface 41 and the image formation plane 50, and is a value representing the position of the image formation plane 50. In addition, a represents a distance between the third surface 41 and the first surface 31, and f represents a focal length of the third surface 41. For example, it is possible to set the position of the image formation plane 50 (distance b) to a desired position by appropriately setting the focal length f and the distance a.

In addition, $m = b/a$ represents a magnification m (virtual image magnification) at which the image displayed on the first surface 31 is magnified as a virtual image. Therefore, for example, it is possible to form a virtual image magnified at a desired magnification by appropriately setting an interval and the like between the first HOE 30 and the second HOE 40.

For example, the distance b between the third surface 41 and the image formation plane 50 is approximately 11 mm in the case where the distance a between the third surface 41 and the first surface 31 is set to 10 mm, and the focal length f of the third surface 41 is set to 100 mm. In addition, at this time, the virtual image magnification m is approximately 1.1. In this case, the virtual image magnified at the 1.1 magnification is formed at a position that is 11 mm away from the third surface 41 in the back.

Figure 3:
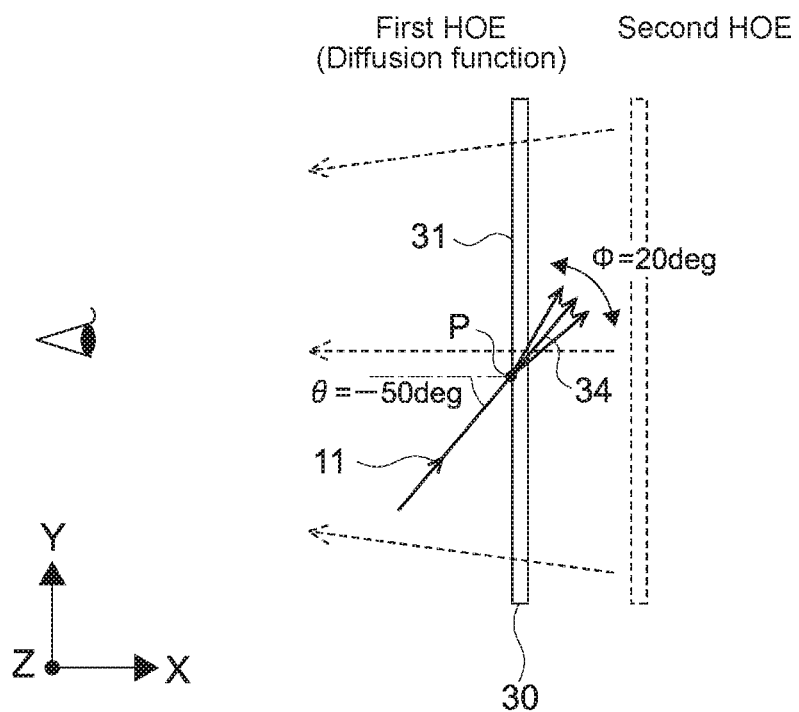
FIG. 3 is a schematic diagram illustrating an example of diffraction of image light through a first HOE.
Figure 4:
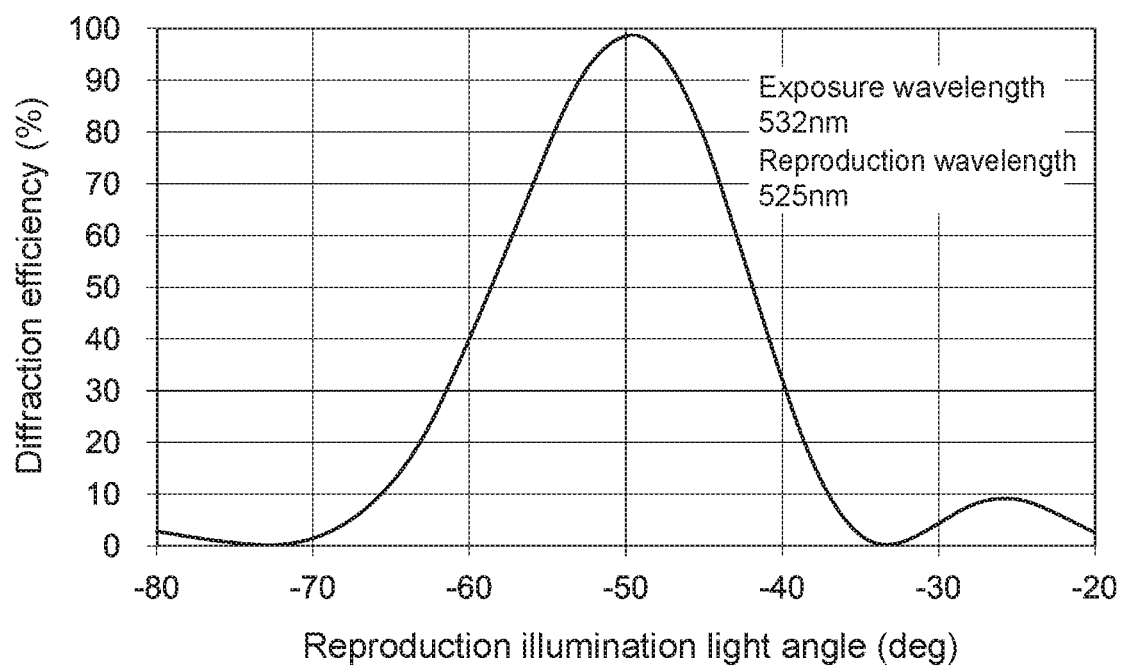
FIG. 4 is a graph showing an example of diffraction efficiency of the first HOE illustrated in FIG. 3.

FIG. 3 is a schematic diagram illustrating an example of diffraction of the image light 11 through the first HOE 30. FIG. 4 is a graph showing an example of diffraction efficiency of the first HOE 30 illustrated in FIG. 3.

FIG. 3 schematically illustrates the image light 11 incident on an incident point P of the first HOE 30, and the diffused light 34 emitted from the incident point P. In addition, FIG. 4 illustrates a relation between diffraction efficiency and incident angles θ of the image light 11 (reproduction illumination light) incident on the incident point P. Note that, the graph illustrated in FIG. 4 shows results obtained in the case where an exposure wavelength is approximately 532 nm, and a reproduction wavelength is approximately 525 nm.

Hereinafter, an incident angle of the image light 11 that is incident from an upper left side is +θ, and an incident angle of the image light 11 that is incident from a lower left side is −θ on the basis of an incident angle (θ=zero degree) obtained in the case where the image light 11 is perpendicularly incident on the first HOE 30.

As illustrated in FIG. 3, the image light 11 is incident on the incident point P on the first HOE 30 at an incident angle θ of approximately −50°. The image light 11 is diffused by the first surface 31 in an angular range of approximately 20°, and emitted from the second surface 32 as the diffused light 34.

As illustrated in FIG. 4, the image light 11 is most efficiently converted into the diffused light 34 in the case where the image light 11 is incident on the incident point P at θ of approximately −50°. Therefore, it is possible to diffuse the image light 11 that has been emitted from the emission section 10 and incident on the incident point P, with high efficiency.

Alternatively, for example, in the case where the incident angle θ is deeper than −30° (an angle that is almost perpendicular to the first surface 31), the diffraction efficiency is 10% or less, and much of the image light 11 passes through the first HOE 30 without being diffracted. In a similar way, the image light 11 also passes through the first HOE 30 in the case where the incident angle θ is shallower than −70°.

At another position (another incident point) on the first surface 31, another angle is set in a manner that the maximum diffraction efficiency is obtained. The angles set at the respective points are decided on the basis of incident angles of the image light 11 incident on the respective points from the emission section 10. This makes it possible for the first surface 31 to most efficiently convert the image light 11 emitted from the emission section 10 into the diffused light 34, and this makes it possible to maintain transparency to light incident from the other directions.

Note that, ways to set angles at the respective points on the first surface 31 to obtain the maximum diffraction efficiency are not limited. For example, a same angle may be set at every points on the whole first surface 31. In addition, it is also possible to set angles for respective regions obtained by dividing the first surface into a plurality of regions. Alternatively, it is possible to appropriately set angles for respective points on the first surface 31 to obtain the maximum diffraction efficiency in accordance with the position, the angle of view, and the like of the emission section 10.

Figure 5:
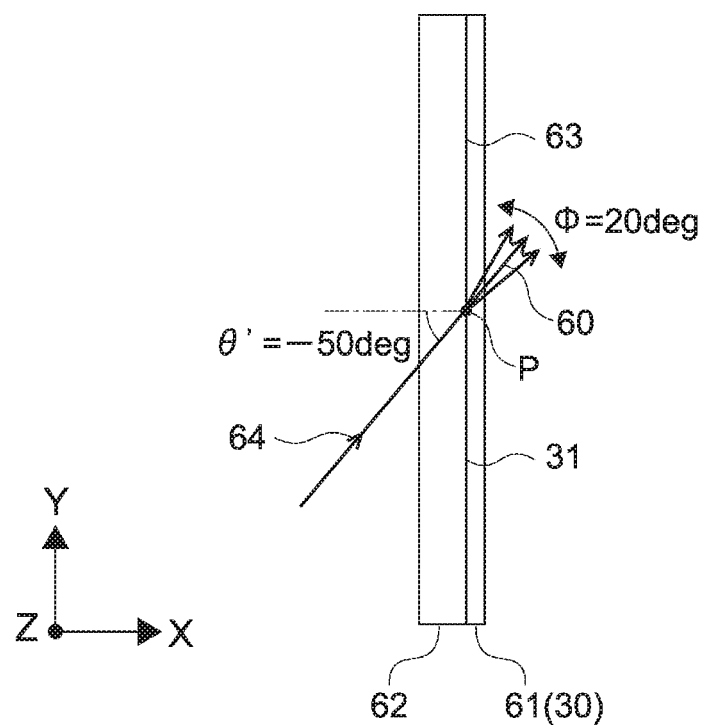
FIG. 5 is a schematic diagram illustrating a generation example of the first HOE illustrated in FIG. 3.

FIG. 5 is a schematic diagram illustrating a generation example of the first HOE 30 illustrated in FIG. 3. FIG. 5 schematically illustrates a configuration when an interference pattern is exposed on the first HOE 30. Diffused light is used as object light 60 to form a hologram (HOE) having a diffusion function. In the example illustrated in FIG. 5, a hologram dry plate 61 before recording the interference pattern, and a diffuser plate 62 capable of generating the object light 60 are used.

For example, the hologram dry plate 61 includes photosensitive material or the like that reacts on a predetermined wavelength. The material or the like of the hologram dry plate 61 is not limited. For example, any photosensitive material or the like may be used. The diffuser plate 62 includes a diffusion/emission surface 63 that diffuses and emits incident light in the predetermined angular range Φ. As the diffuser plate 62, it is possible to use any diffuser plate such as a lens array diffuser plate, a frosted glass diffuser plate, or the like that distributes incident light at a predetermined light distribution angle. In FIG. 5, the diffuser plate 62 having the diffused light angular range Φ of approximately 20° is used.

As illustrated in FIG. 5, one surface of the hologram dry plate 61 and the diffusion/emission surface 63 of the diffuser plate 62 are disposed in a manner that they are close to each other. Reference light 64 is incident from a side opposite to the diffusion/emission surface 63 of the diffuser plate 62. As the reference light 64, laser light or the like having a predetermined wavelength (exposure wavelength) is used. In FIG. 5, the reference light 64 is incident at an incident angle of approximately −50° toward a position serving as the incident point P. In addition, at other positions, the reference light 64 is incident at angles that are similar to the angles of the image light 11 incident on the respective points from the emission section 10. Hereinafter, the incident angle of the reference light 64 is referred to as a reference light angle θ'.

A portion of the reference light 64 incident on the diffuser plate 62 is diffused by the diffusion/emission surface 63 and incident on the hologram dry plate 61 as the object light 60. In addition, another portion of the reference light 64 passes through the diffusion/emission surface 63, and incident on the hologram dry plate 61. As a result, an interference pattern made from the object light 60 and the reference light 64 that have passed through the diffuser plate 62 is recorded on the hologram dry plate 61. The hologram dry plate 61 on which the interference pattern is exposed is used as the first HOE 30. Note that, a surface of the hologram dry plate 61 that faces the diffusion/emission surface 63 corresponds to the first surface 31 of the first HOE 30.

By exposing the first HOE 30 as described above, it is possible to configure the transmissive holographic optical element having the diffusion function. In addition, angles at which the maximum diffraction efficiency is obtained on the respective points on the first surface 31 are set on the basis of the reference light angle θ' used when the interference pattern is exposed at the respective points. Therefore, by appropriately controlling the reference light angle θ', it is possible for the first surface 31 to have desired angular selectivity.

The present technology is not limited to the case where the respective points of the first surface 31 are exposed by using different reference light angles θ'. For example, it is also possible to expose the whole first surface 31 by using a same reference light angle θ'. This makes it possible to omit a mechanism or the like for adjusting the reference light angle θ', and it is possible to easily expose the first HOE 30.

Note that, with reference to FIG. 5, single light flux exposure that performs exposure using a single light flux (the reference light 64) has been described. The present technology is not limited thereto. It is possible to appropriately perform double light flux exposure or the like that generates an interference pattern while separating light for generating diffused light (the object light 60) from the reference light 64 that interferes with the diffused light. When the double light flux exposure is performed, it is possible to radiate the object light 60 at an angle different from the reference light angle θ'. For example, it is possible to control emission directions of the diffused light at the respective points on the first surface 31.

Figure 6:
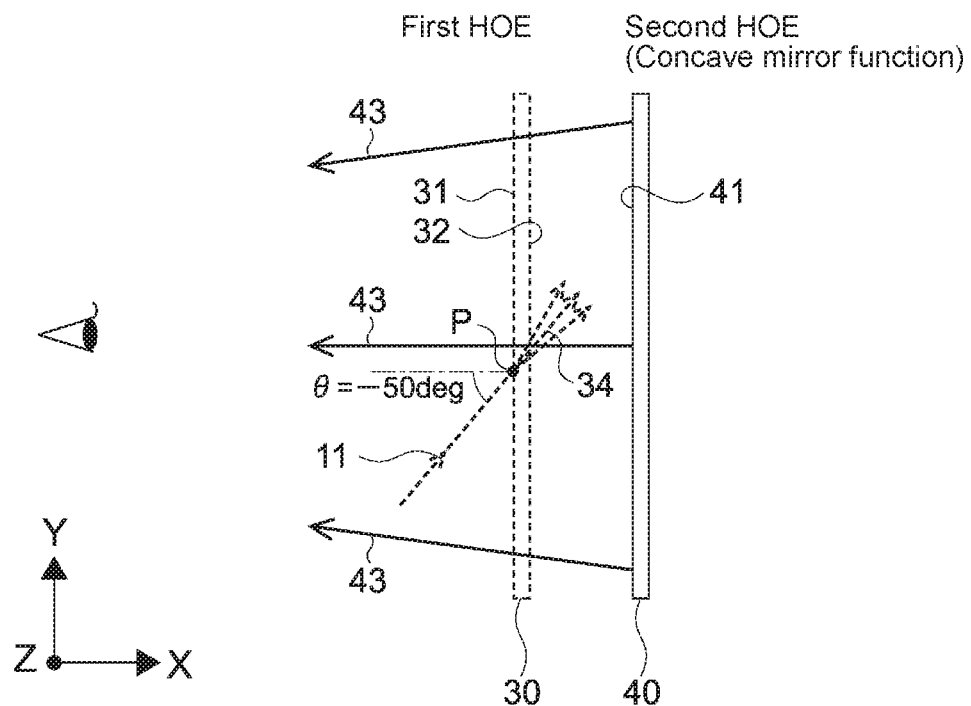
FIG. 6 is a schematic diagram illustrating an example of diffraction of image light through a second HOE.

FIG. 6 is a schematic diagram illustrating an example of diffraction of the image light 11 through the second HOE 40.

On the third surface 41 of the second HOE 40, the diffused light 34 that has been emitted from the respective points on the first surface 31 of the first HOE 30 is incident. The third surface 41 has an optical function as a mirror surface of the concave mirror. The third surface 41 reflects the diffused light 34 in a manner that virtual images of the respective points on the first surface 31 are formed. In other words, the third surface 41 emits the image light 43 that forms the virtual images.

The image light 43 that forms the virtual images is incident on the second surface 32 of the first HOE 30. In this case, incident angles of the image light 43 that forms the virtual images on the second surface 32 deviate from a range of incident angles having high diffraction efficiency (see FIG. 4) on the first HOE 30. Therefore, the image light that forms the virtual images passes through the first HOE 30 without being scattered by the first HOE 30.

Figure 7:
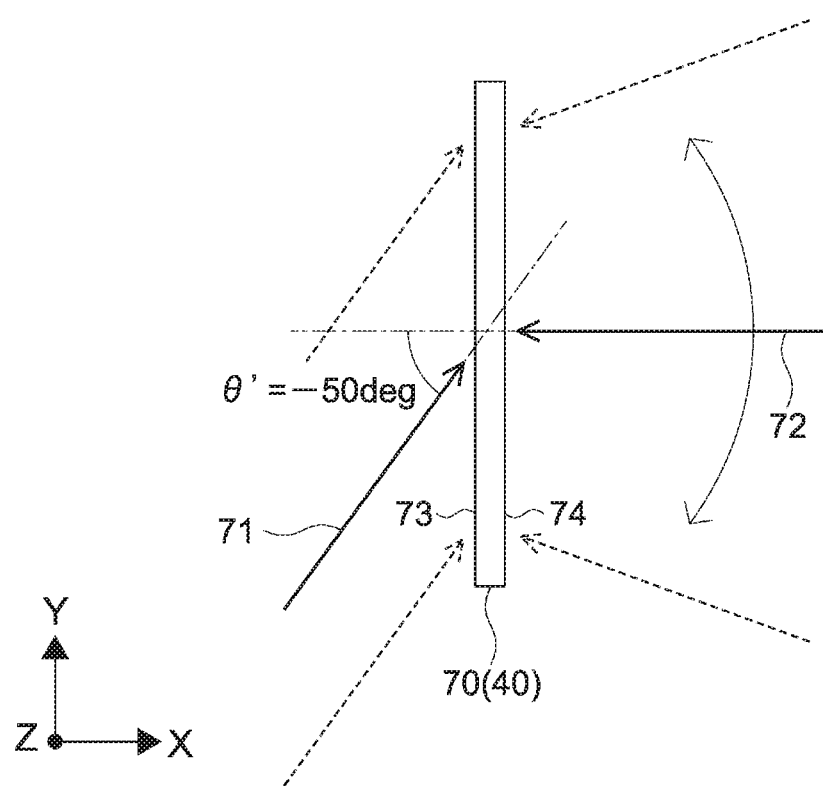
FIG. 7 is a schematic diagram illustrating a generation example of the second HOE.

FIG. 7 is a schematic diagram illustrating a generation example of the second HOE 40. The second HOE 40 is a reflective hologram, and is generated by performing the double light flux exposure in which the reference light and the object light are incident from different directions and the interference pattern is exposed.

As illustrated in FIG. 7, reference light 71, object light 72, and a hologram dry plate 70 before the interference pattern is recorded are used for the exposure of the second HOE 40. The hologram dry plate 70 includes a fifth surface 73 and a sixth surface 74 opposite to the fifth surface 73.

As illustrated in FIG. 7, the reference light 71 is radiated to the fifth surface 73 of the hologram dry plate 70, and the object light 72 is radiated to the six surface. On the hologram dry plate 70, an interference pattern is recorded, and a reflective hologram is formed. The interference pattern is formed through interference between the reference light 71 and the object light 72 that are incident from the different surfaces. The reference light 71 and the object light 72 have wavelengths (exposure wavelengths) similar to the wavelength used for exposure of the first HOE 30.

For example, a laser light source and a separation optical system are disposed (they are not illustrated). The laser light source emits laser light having the exposure wavelength. The separation optical system includes a beam splitter or the like. The laser light having the exposure wavelength is separated by the separation optical system. One of the laser light is radiated to the fifth surface 73 as the reference light 71. The other of the laser light is radiated to the sixth surface 74 as the object light 72. This makes it possible to easily perform the double light flux exposure. Of course, it is possible to use another configuration.

In the example illustrated in FIG. 7, the reference light 71 is incident on the whole surface of the fifth surface 73 at a constant reference light angle θ' (approximately −50°). The object light 72 is incident on the sixth surface 74 in a manner that the object light 72 is substantially perpendicular to the sixth surface 74 when exposing a central part of the hologram dry plate 70. When exposing an upper part of the hologram dry plate 70, an incident angle tilts in a manner that the object light 72 is incident from the obliquely upward direction. Alternatively, when exposing a lower part, the incident angle tilts in a manner that the object light 72 is incident from the obliquely downward direction.

As described above, by adjusting the incident angles of the object light 72 at respective positions of the hologram dry plate 70, it is possible to control the propagation directions of the image light 11 diffracted (reflected) through the interference pattern. This makes it possible to expose the interference pattern that functions as the concave mirror, on the hologram dry plate 70. The hologram dry plate 70 on which the interference pattern is exposed is used as the second HOE 40. Note that, the fifth surface 73 of the hologram dry plate 70 corresponds to the third surface 41 of the second HOE 40.

The way or the like to record the optical function as the concave mirror is not limited. For example, it is possible to appropriately control the exposure conditions such as the incident angles and the like of the object light 72, and configure the second HOE 40 having a desired focal length, and a desired direction of an optical axis.

Figure 8:
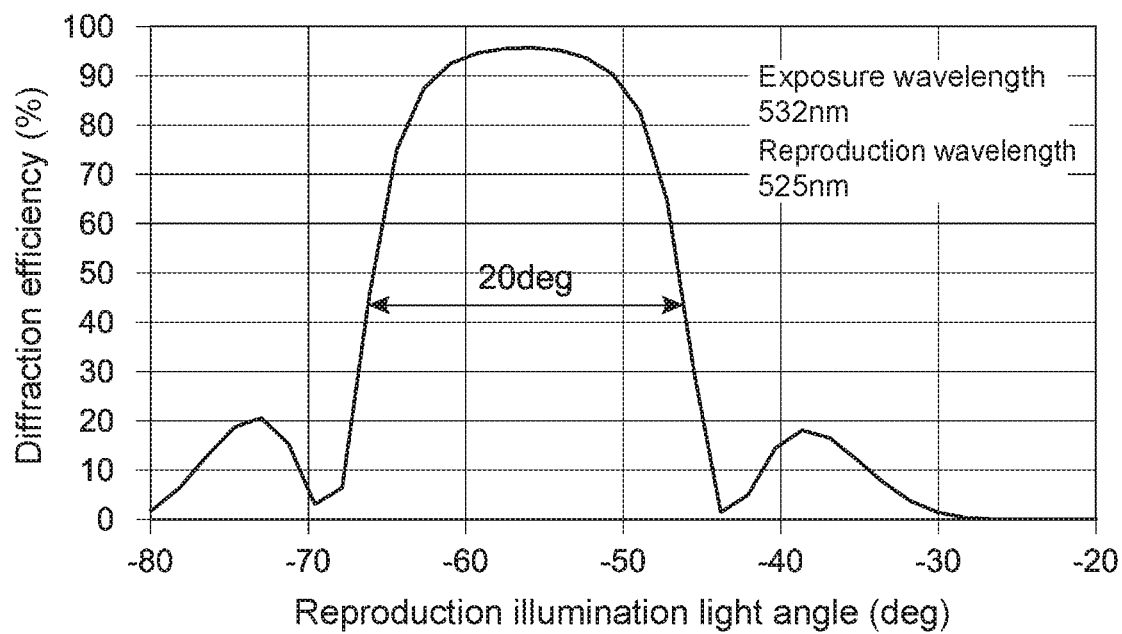
FIG. 8 is a graph showing an example of diffraction efficiency of the second HOE.
Figure 9:
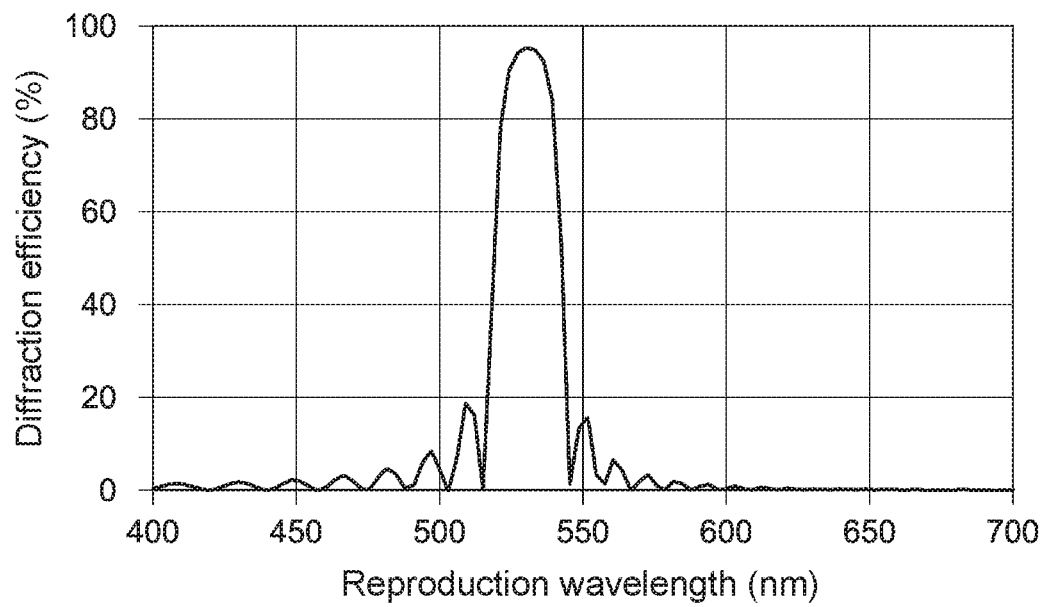
FIG. 9 is a graph showing an example of a wavelength property of the second HOE.

FIG. 8 is a graph showing an example of diffraction efficiency of the second HOE 40. FIG. 9 is a graph showing an example of a wavelength property of the second HOE 40.

FIG. 8 illustrates diffraction efficiency obtained in a region (central part) in which the object light 72 is perpendicularly incident and exposure is performed. The second HOE 40 has an exposure wavelength of approximately 532 nm, and a reproduction wavelength of approximately 525 nm.

As illustrated in FIG. 8, the second HOE 40 has angular dependency for efficiently diffracting (reflecting) the image light 11 (diffracted light 34) incident in an angular range of approximately 20°, such as an angular range from −65° to −55°. In other words, the third surface 41 of the second HOE 40 reflects not only the image light 11 incident at incident angles that are similar to the reference light angle (approximately)−50° used for the exposure, but also the image light 11 incident in the above-described angular range of approximately 20°, with high diffraction efficiency.

In this embodiment, the angular range Φ of the image light 11 to be diffused by the first surface 31 is set on the basis of the angular dependency of the diffraction efficiency of the third surface 41. For example, the angular range Φ (approximately −20°) of the diffused light 34 described with reference to FIG. 3 is set on the basis of the angular range of the incident angles of the image light 11 that is diffusible through the third surface 41 with high efficiency.

This makes it possible for the third surface 41 to efficiently reflect the image light 11 (the diffused light 34) diffused through the first surface 31 of the first HOE 30 in the angular range Φ of approximately 20°.

Note that, even at positions different from the central part, the second HOE 40 has the angular dependency of the diffraction efficiency as illustrated in FIG. 8. Therefore, the third surface 41 functions as the concave mirror that reflects the image light 11 diffused at the respective points on the first surface 31, with high efficiency. This makes it possible to improve luminance and the like of the virtual images formed on the image formation plane, for example.

FIG. 9 illustrates diffraction efficiency obtained in the case where the laser light (image light 11) having various reproduction wavelengths is incident on the second HOE 40. A horizontal axis of the graph represents the reproduction wavelengths, and a vertical axis represents the diffraction efficiency. As illustrated in FIG. 9, the second HOE 40 has high diffraction efficiency with respect to green light having wavelengths of approximately 520 nm to approximately 540 nm. In addition, the second HOE 40 hardly diffracts light having the other wavelengths, and the light passes through the second HOE 40.

Therefore, the second HOE 40 efficiently reflects the image light 11 emitted from the emission section 10, and transmits environmental light from a lighting device or the like, for example. As described above, the second HOE 40 has strong wavelength selectivity that is a property of the reflective hologram, and achieves high transparency to the environmental light and the like.

Figure 10:
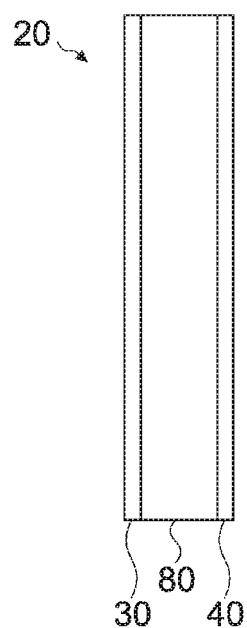
FIG. 10 is a schematic diagram illustrating a specific configuration for integrally holding the first HOE and the second HOE.

FIG. 10 is a schematic diagram illustrating a specific configuration for integrally holding the first HOE 30 and the second HOE 40. The screen unit 20 illustrated in FIG. 10 includes the first HOE 30, the second HOE 40, and transparent base material 80. In this embodiment, the transparent base material 80 corresponds to transparent material.

The transparent base material 80 has a plate-like shape, and is interposed between the first HOE 30 and the second HOE 40. One surface of the transparent base material 80 connects with the first HOE 30, and the other surface connects with the second HOE 40. Therefore, the screen unit 20 has a structure in which the first HOE 30, the transparent base material 80, and the second HOE 40 are bonded in this order. Examples of the transparent base material 80 include any transparent material such as acrylic resin or polycarbonate.

This makes it possible to integrate the first HOE 30 and the second HOE 40 as the single screen unit 20. As a result, it is possible to sufficiently prevent deviation of the positional relation between the first HOE 30 and the second HOE 40.

The specific structure for integrally holding the first HOE 30 and the second HOE 40 is not limited. Any holding mechanism or the like may be used. For example, when employing a structure in which a gap between the first HOE 30 and the second HOE 40 is hollowed and they are integrally held, it is possible to lengthen an optical distance between the HOEs. This makes it possible to distance the second HOE 40 from the position of the image formation plane on which the virtual images are formed.

In such a way, the image display apparatus 100 according to this embodiment includes the first HOE 30 and the second HOE 40 that are integrated, and the image light 11 is emitted to the first surface 31 of the first HOE 30. The third surface 41 of the second HOE 40 controls the propagation directions of the image light 11 diffused at the respective points on the first surface 31, and forms the virtual image of the first surface 31. This makes it possible to achieve excellent visual effects.

Examples of the method for projecting the image light on the transparent screen or the like and displaying an image include a method for displaying the image light diffused by the transparent screen as it is. In this case, an observer observes the image light diffused by a surface of the transparent screen. Therefore, the surface of the transparent screen serves as a display surface.

Surface reflection occurs on the surface of the transparent screen and a surface of the transparent base material on which the transparent screen is disposed. The surface reflection is reflection of light from the lighting device or the like. Therefore, the transparent screen, the transparent base material, and the like are visually recognized, and there is a possibility that the observer cannot see the image displayed on the surface of the transparent screen as if the image hung in the air.

In the image display apparatus 100 according to this embodiment, the image light 11 diffused by the first surface 31 of the first HOE 30 is incident on the third surface 41 of the second HOE 40. The third surface 41 reflects (diffracts) the image light 11 in a manner that the virtual image of the first surface 31 is formed. This makes it possible to form the virtual image of the first surface 31 on the image formation plane 50 that is different from the surfaces (such as the first surface 31) of the first HOE 30 and the second HOE 40.

It is possible for an observer to visually recognize the virtual image formed at the different position from the surface of the screen unit 20, by seeing the front side of the screen unit 20. As a result, the observer sees the image as if the image hung in the air, and the observer can enjoy the image display as if the image were floating in the air.

For example, it is possible for the observer to visually recognize the virtual image displayed behind the back surface (the fourth surface 42) of the screen unit 20 (see FIG. 1). This makes it possible for the observer to see the image that is floating in the air behind the screen unit 20. This is different from surface reflection occurred on the first to fourth surfaces 31 to 42 and the like of the screen unit 20. Therefore, excellent visual effects are achieved.

In this embodiment, the first HOE 30 is configured in a manner that the image light 11 emitted from the emission section 10 is selectively diffused. Therefore, for example, the image light 11 reflected by the second HOE 40 passes through the first HOE 30 without being diffused. This makes it possible to sufficiently suppress bokeh and the like of the image caused by diffusion or the like occurred when the light passes through the hologram. As a result, it is possible to display a clear image.

In addition, the diffusion range (angular range) of the image light 11 diffused by the first surface 31 is set to the same range as an angular range that achieves high diffraction efficiency on the third surface 41. Therefore, the image light 11 diffused by the first surface 31 hardly passes through the second HOE 40, and the image light 11 is converted into the image light 43 that forms a virtual image. This makes it possible to display a bright virtual image, and display a highly visible image.

Second Embodiment

An image display apparatus according to a second embodiment of the present technology will be described. Hereinafter, description will be omitted or simplified with regard to structural elements and workings that are similar to the image display apparatus 100 described in the above embodiment.

Figure 11:
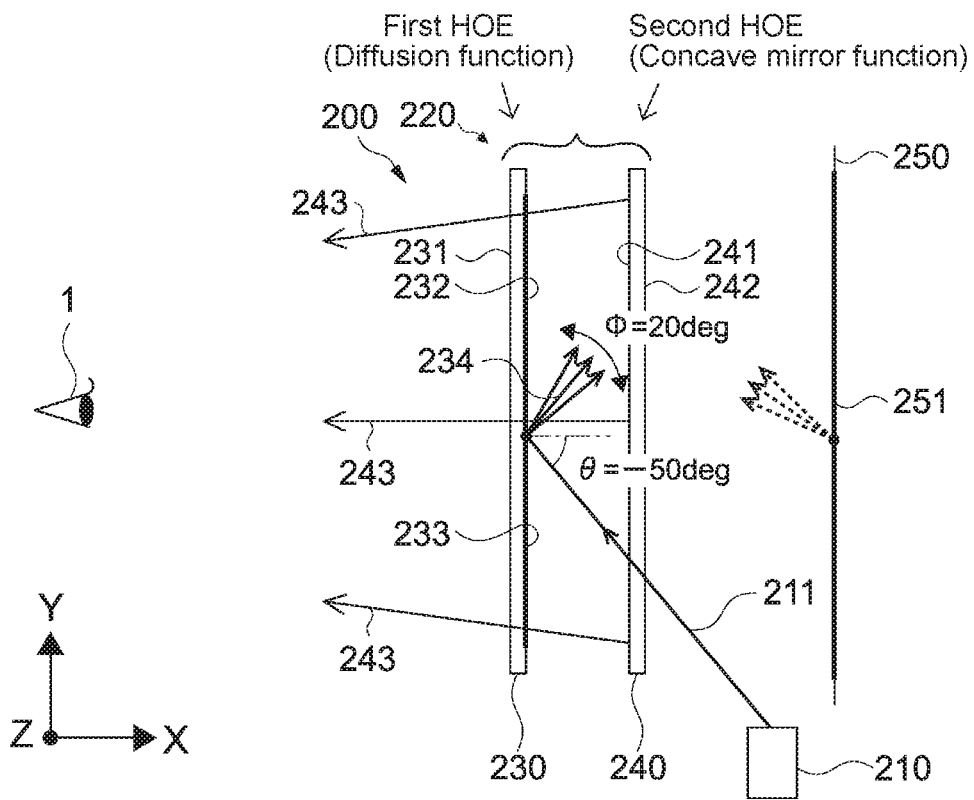
FIG. 11 is a schematic diagram illustrating a configuration example of an image display apparatus according to a second embodiment.

FIG. 11 is a schematic diagram illustrating a configuration example of an image display apparatus 200 according to the second embodiment. An image display apparatus 200 includes an emission section 210 and a screen unit 220. The screen unit 220 includes a first HOE 230 and a second HOE 240.

The emission section 210 is disposed at a lower back side (right side) of the screen unit 220, which is opposite to the front side of the screen unit 220. The emission section 210 emits image light 211 toward the screen unit 220. FIG. 1 illustrates an optical path of the image light 211 incident on the screen unit 220 at an incident angle of approximately 50°. Of course, the present disclosure is not limited thereto. It is also possible for the emission section 210 to emit the image light 211 at a predetermined angle of view.

The first HOE 230 includes a first surface 231 that faces the front side of screen unit 220, and a second surface 232 opposite to the first surface 231. In this embodiment, a reflective holographic optical element is used as the first HOE 230. The reflective holographic optical element diffuses and reflects the image light 211 incident on the second surface 232. The first HOE 230 has a property of diffusing and reflecting light incident at incident angles, on the basis of the incident angles of the image light 211 incident on respective points on the second surface 232. In this embodiment, the second surface 231 corresponds to the diffusion surface.

The second HOE 240 includes a third surface 241 that faces the second surface 232, and a fourth surface 242 opposite to the third surface 241. A reflective holographic optical element is used as the second HOE 240. The reflective holographic optical element diffracts light incident on the third surface 241 toward the light incident side (left side). The second HOE 240 is configured in a way similar to the second HOE 40 illustrated in FIG. 1, for example.

As illustrated in FIG. 11, the image light 211 emitted from the emission section 210 is incident on the fourth surface 242 of the second HOE 240 from an obliquely downward direction. The incident angle of the image light 211 incident on the fourth surface 424 deviates from an angular range having high diffraction efficiency on the second HOE 240 (see FIG. 8). Therefore, the image light 211 incident on the fourth surface 242 passes through the second HOE 240, and the image light 211 is emitted from the third surface 241 as it is.

The image light 211 that has passed through the second HOE 240 is incident on respective points on the second surface 231 of the first HOE 230. The second surface 231 diffuses and reflects the image light 211 incident on the second surface 231 in a predetermined angular range Φ of approximately 20°. In other words, the diffused image light 211 (diffused light 234) is emitted from the respective points on the second surface 231 toward the third surface 241 of the second HOE 240. In FIG. 11, a thick line schematically represents an image 233 including the image light 211 emitted from the respective points on the second surface 231.

The third surface 241 reflects (diffracts) the diffused light 234 that has been incident on the third surface 241, in a manner that virtual images of the respective points on the second surface 232 are formed. The third surface 241 emits image light 243 that forms the virtual images, and the virtual image 251 of the image 233 displayed on the second surface 232 is formed on an image formation plane 250. In FIG. 11, a thick line schematically represents the virtual image 251 formed on the image formation plane 250.

The image light 243 that forms the virtual image passes through the first HOE 230, and is emitted toward the point of view 1 of the observer from the front side of the screen unit 220. This makes it possible for the observer to visually recognize the virtual image 251 formed behind the screen unit 220.

Figure 12:
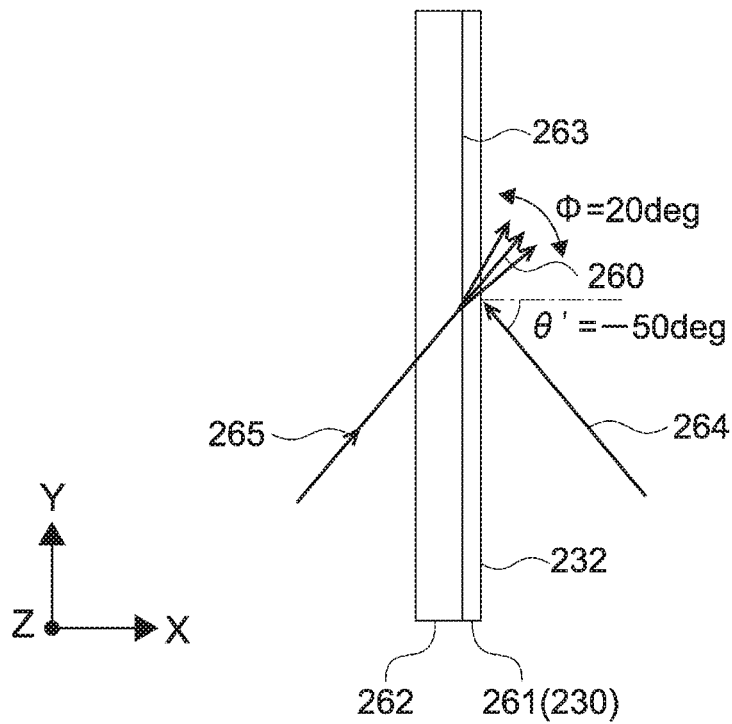
FIG. 12 is a schematic diagram illustrating a generation example of a first HOE illustrated in FIG. 11.

FIG. 12 is a schematic diagram illustrating a generation example of the first HOE 230 illustrated in FIG. 11. To generate the first HOE 230, a hologram dry plate 261 and a diffuser plate 262 capable of generating diffused light 260 are used. In FIG. 12, the diffuser plate 262 having an angular range Φ of approximately 20° with regard to the diffused light 260 is used.

As illustrated in FIG. 12, one surface of the hologram dry plate 261 and a diffusion/emission surface 263 of the diffuser plate 262 are disposed in a manner that they are close to each other. Object light 265 is incident from a side opposite to the diffusion/emission surface 263 of the diffuser plate 262. The object light 265 incident on the diffuser plate 262 is emitted from the diffusion/emission surface 263 as the diffused light 260, and incident on the hologram dry plate 261. A way or the like to set the incident angle of the object light 265 is not limited. For example, the incident angle of the object light 265 may be appropriately set in a manner that the incident angle falls within an angular range having high diffraction efficiency of the second HOE 240.

The reference light 264 is incident from a side of the hologram dry plate 261 opposite to a side close to the diffuser plate 262. FIG. 12 illustrates the reference light 264 incident at a reference light angle of approximately −50°. Note that, at other positions on the hologram dry plate 261, the reference light 264 is incident at angles that are similar to the angles of the image light 211 incident on the respective points from the emission section 210.

On the hologram dry plate 261, an interference pattern is recorded. The interference pattern is made from the diffused light 260 (object light 265) incident from one side, and the reference light 264 incident from the other side. This makes it possible to configure the first HOE 230 having an optical function of reflecting and diffusing the image light 211 emitted by the emission section 210. Note that, the surface of the hologram dry plate 261 on which the reference light 264 is incident corresponds to the second surface 232 of the first HOE 230.

The image display apparatus 200 according to this embodiment includes the reflective first HOE 230. This makes it possible to dispose the emission section 210 behind the screen unit 220. As a result, it is possible to dispose the image display apparatus 200 at various installation positions such as a shop window in a store and a reception desk, for example, and it is possible to provide excellent visual effects in various circumstances.

Third Embodiment

Figure 13:
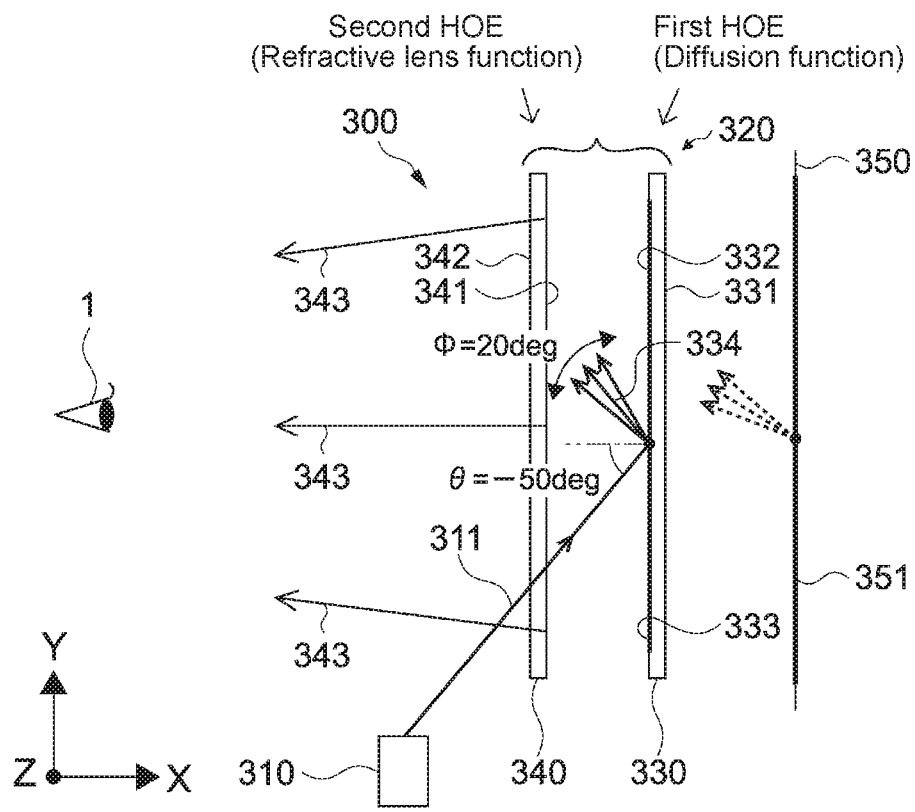
FIG. 13 is a schematic diagram illustrating a configuration example of an image display apparatus according to a third embodiment.

FIG. 13 is a schematic diagram illustrating a configuration example of an image display apparatus 300 according to a third embodiment. An image display apparatus 300 includes an emission section 310 and a screen unit 320. The screen unit 320 includes a first HOE 330 and a second HOE 340. As illustrated in FIG. 13, with regard to the image display apparatus 300, the second HOE 340 is disposed in front (left side) of the screen unit 320, and the first HOE 330 is disposed behind (right side) the screen unit 320.

The emission section 310 is disposed at a lower front side of the screen unit 320. The emission section 310 emits the image light 311 toward the screen unit 320. FIG. 13 illustrates optical paths of the image light 311 incident on the screen unit 320 at an incident angle of approximately −50°. Of course, the present disclosure is not limited thereto. It is also possible for the emission section 310 to emit the image light 311 at a predetermined angle of view.

The first HOE 330 includes a first surface 331 and a second surface 332 that is opposite to the first surface 331. The first HOE 330 is disposed in a manner that the second surface 332 faces the second HOE 340. A reflective holographic optical element is used as the first HOE 330. The reflective holographic optical element diffuses and reflects the image light 311 incident on respective points on the second surface 332. In this embodiment, the second surface 332 corresponds to the diffusion surface.

The second HOE 340 includes a third surface 341 that faces the first HOE 330, and a fourth surface 342 opposite to the third surface 341. Therefore, the screen unit 320 is disposed in a manner that the fourth surface 342 of the second HOE is disposed on the front side.

In this embodiment, a transmissive holographic optical element (HOE) is used as the second HOE 340. The transmissive holographic optical element (HOE) controls propagation directions of light incident on the third surface 341 and emits the light from the fourth surface 342. In addition, the second HOE 340 is appropriately configured in a manner that the third surface 341 has an optical function as a refractive lens. In this embodiment, the third surface 341 corresponds to the control surface.

The third surface 341 controls propagation directions of image light 311 (diffused light 334) diffused at the respective points on the second surface 332 of the first HOE 330, and forms a virtual image of the second surface 332. In addition, the third surface 341 includes an optical axis and a focus. For example, the virtual image of the second surface 332 is formed on an image formation plane 350 that is orthogonal to the optical axis. The virtual image of the second surface 332 has a size corresponding to a focal length.

As illustrated in FIG. 13, the image light 311 emitted from the emission section 310 is incident on the fourth surface 342 of the second HOE 340 from an obliquely downward direction. The image light 311 incident on the fourth surface 342 passes through the second HOE 340, and the image light 311 is emitted from the third surface 341 as it is.

The image light 311 that has passed through the second HOE 340 is incident on respective points on the second surface 332 of the first HOE 330. The second surface 332 emits the image light 331 incident on the respective points as the diffused light 334 diffused in an angular range Φ of approximately 20°. This makes it possible to display an image 333 including the image light 311 on the second surface 332. The diffused light 334 emitted from the respective points on the second surface 332 is incident on the third surface 341 of the second HOE 340.

The diffused light 334 incident on the third surface 341 is diffracted in a manner that virtual images of the respective points on the second surface 332 are formed. The diffused light 334 after the diffraction is emitted from the fourth surface 342 as image light 343 that forms the virtual images. As a result, a virtual image 351 of the image 333 displayed on the second surface 332 is formed on the image formation plane 350 that is disposed across the second surface 332 from the second HOE 340.

Figure 14:
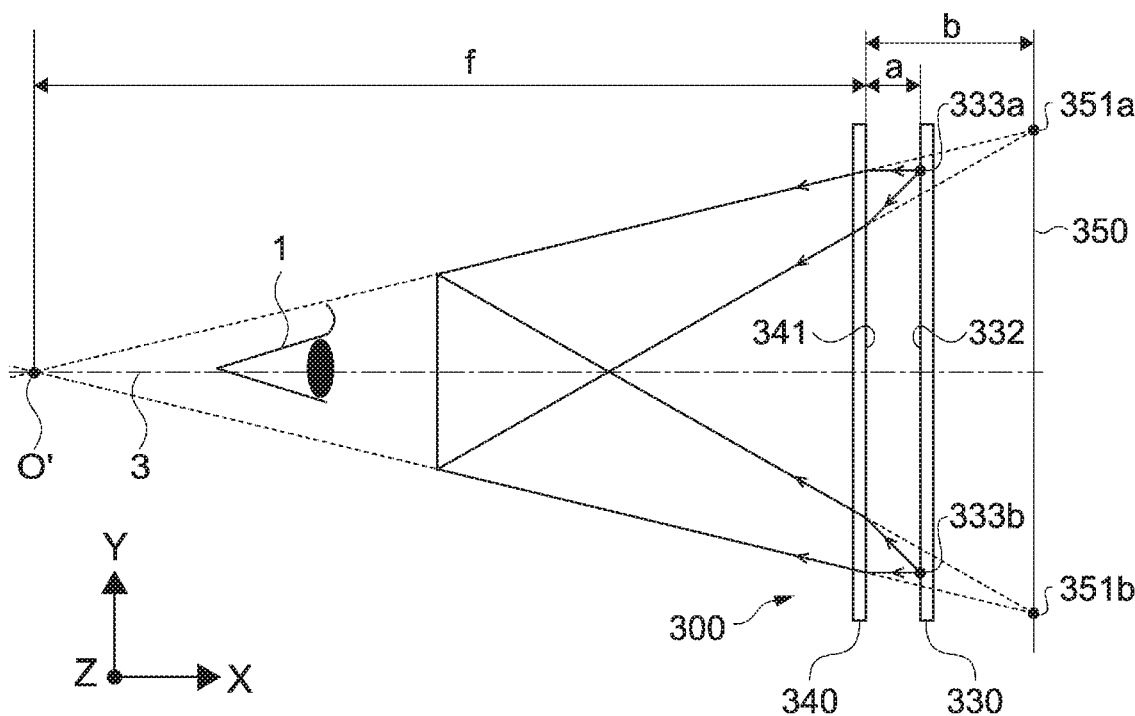
FIG. 14 is a schematic diagram for describing an optical property of the image display apparatus.

FIG. 14 is a schematic diagram for describing optical properties of the image display apparatus 300. FIG. 14 illustrates an optical axis 3 and a focus O' of the second HOE 340.

As illustrated in FIG. 14, in the image display apparatus, a virtual image optical system is configured in a manner that a distance a between the third surface 341 and the second surface 332 is shorter than a focal length f of the second HOE 340. This makes it possible to form a virtual image of the second surface 332 through the third surface 341 that functions as a refractive lens (convex lens in FIG. 14). FIG. 14 schematically illustrates a virtual image 351a of an upper side incident point 333a and a virtual image 351b of a lower side incident point 333b. The virtual images 531a and 351b are formed on the image formation plane 350.

The position of the image formation plane 350 on which the virtual images are formed, that is, a distance b between the third surface 341 to the image formation plane 350 is represented by a virtual image formula $(1/b)=(1/a)-(1/f)$, which has been described with reference to FIG. 2, for example. Therefore, for example, it is possible to control display positions, sizes, and the like of the virtual images by appropriately setting the focal length f and the distance a.

Figure 15:
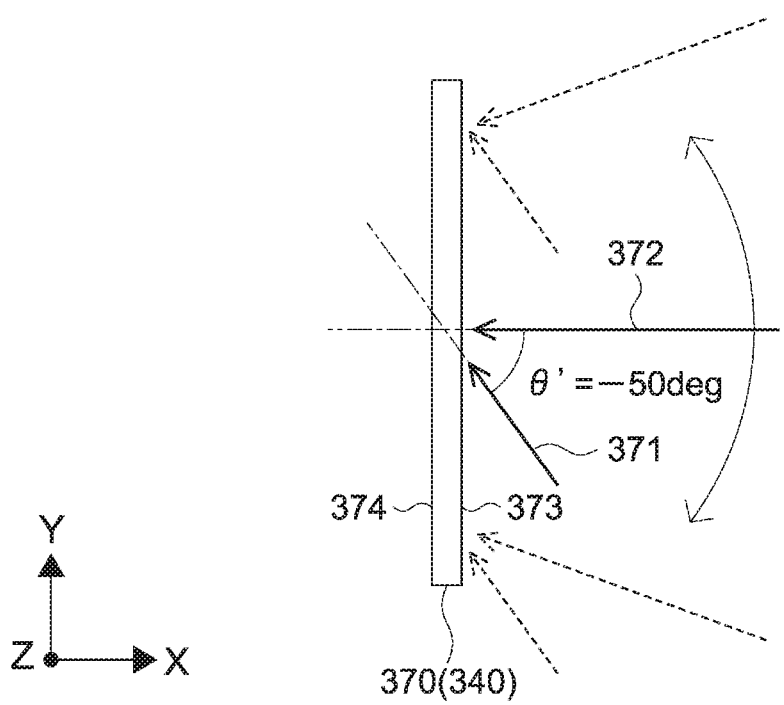
FIG. 15 is a schematic diagram illustrating a generation example of a second HOE illustrated in FIG. 13.

FIG. 15 is a schematic diagram illustrating a generation example of the second HOE 340 illustrated in FIG. 13. Reference light 371, object light 372, and a hologram dry plate 370 before the interference pattern is recorded are used for the exposure of the second HOE 340. The hologram dry plate 370 includes a fifth surface 373 and a sixth surface 374 opposite to the fifth surface 373.

As illustrated in FIG. 15, the reference light 371 and the object light 372 are radiated to the fifth surface 373 of the hologram dry plate 370 at different angles. On the hologram dry plate 370, an interference pattern is recorded, and a transmissive hologram is formed. The interference pattern is formed through interference between the reference light 371 and the object light 372 that are incident from the fifth surface 373 at different angles. The reference light 371 and the object light 372 have wavelengths (exposure wavelengths) similar to the wavelength used for exposure of the first HOE 330.

The reference light 371 is incident on the whole surface of the fifth surface 373 at a constant reference light angle θ' (approximately −50°). The object light 372 is incident on the fifth surface 373 in a manner that the object light 372 is substantially perpendicular to the fifth surface 373 when exposing a central part of the hologram dry plate 370. When exposing an upper part of the hologram dry plate 370, an incident angle tilts in a manner that the object light 372 is incident from the obliquely upward direction. Alternatively, when exposing a lower part, an incident angle tilts in a manner that the object light 372 is incident from the obliquely downward direction.

As described above, by adjusting the incident angles of the object light 372 at respective positions of the hologram dry plate 370, it is possible to expose the interference pattern that functions as the refractive lens, on the hologram dry plate 370. The hologram dry plate 370 on which the interference pattern is exposed is used as the second HOE 340. Note that, the fifth surface 373 of the hologram dry plate 370 corresponds to the third surface 341 of the second HOE 340.

The way or the like to record the optical function as the refractive lens is not limited. For example, it is possible to appropriately control the exposure conditions such as the incident angles and the like of the object light 372, and configure the second HOE 340 having a desired focal length, and a desired direction of an optical axis.

It is possible to form a virtual image at a position different from the screen unit 320, even in the case where the transmissive holographic optical element is used as the second HOE 340. This makes it possible to display an image as if the image were floating in the air, and this makes it possible to achieve excellent visual effects in various circumstance.

Fourth Embodiment

Figure 16:
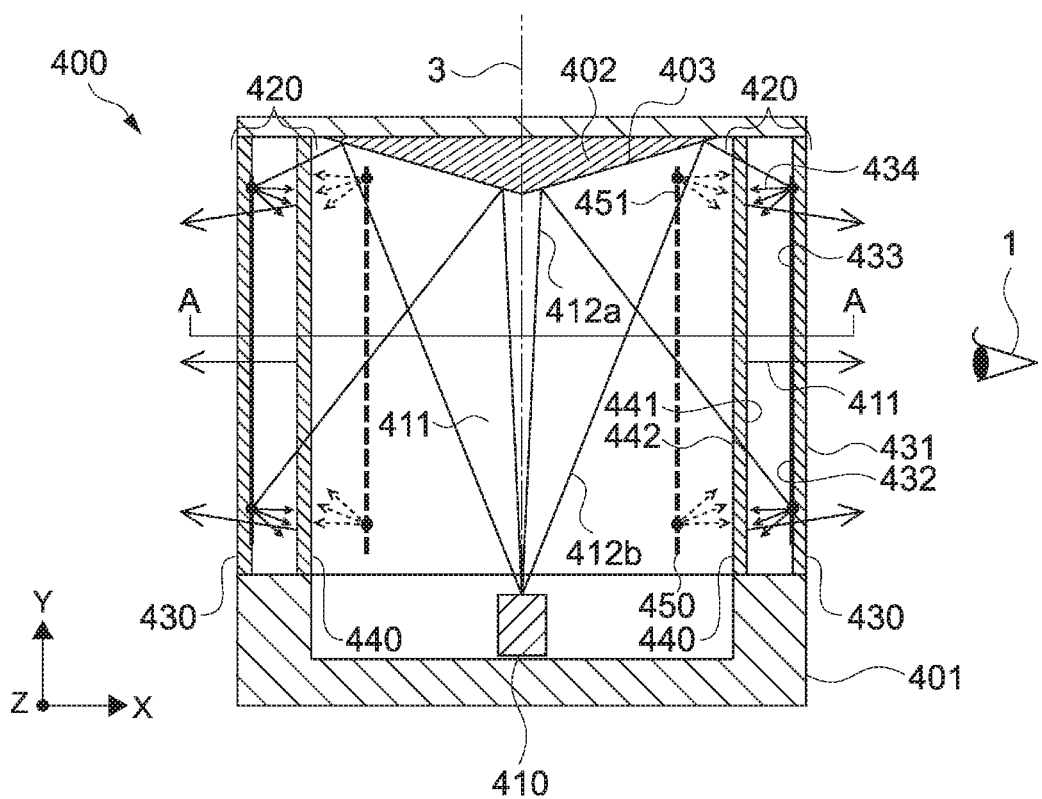
FIG. 16 is a schematic diagram illustrating a configuration example of an image display apparatus according to a fourth embodiment.
Figure 17:
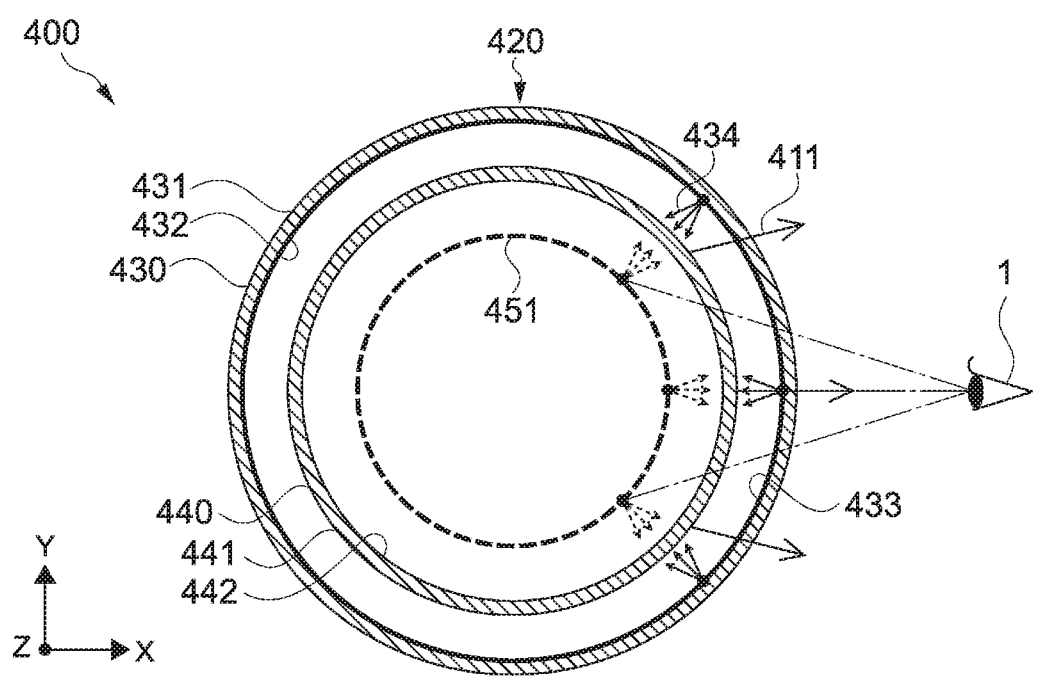
FIG. 17 is a schematic diagram illustrating a cross-sectional view of the image display apparatus taken along a line AA illustrated in FIG. 16.

FIG. 16 is a schematic diagram illustrating a configuration example of an image display apparatus 400 according to a fourth embodiment. FIG. 17 is a schematic diagram illustrating a cross-sectional view of the image display apparatus 400 taken along a line AA illustrated in FIG. 16. The image display apparatus 400 includes a base 401, an emission section 410, a reflective mirror 402, and a screen unit 420.

The base 401 has a cylindrical shape, and the base 10 is disposed at a bottom of the image display device 400. The base 40 holds the emission section 410, the screen unit 420, and the reflective mirror 402 through any holding mechanism (not illustrated). In addition, on the base 401, elements or the like that are necessary to operate the image display device 400 are appropriately disposed, such as an electric power supply source like a battery, speaker, or another element (that are not illustrated). The shape and the like of the base 401 are not limited. For example, the base 401 has any shape such as a cuboid.

The emission section 410 is disposed at a substantially center of the cylindrical base 401 in a manner that the emission section 410 faces upward. The emission section 410 emits image light 411 along the optical axis 3 that extends in the up-down direction (Y direction). FIG. 16 illustrates a cross section of the image display device 400 taken along any surface direction including the optical axis 3 of the emission section 410. The emission section 410 radially emits the image light 411 along the optical axis 3.

Therefore, as illustrated in FIG. 16, the emission section 410 emits the image light 411 at a predetermined angle of view on any plane including the optical axis 3.

FIG. 16 schematically illustrates an inner optical path 412a that has a small emission angle and that is near the optical axis 3, and an outer optical path 412b that has a large emission angle and that is distant from the optical axis 3. Note that, the emission angle means an angle between the optical axis 3 and an optical path of light corresponding to each pixel of the image light 411, for example.

The reflective mirror 402 includes a reflection surface 403, and is disposed on the basis of the optical axis 3 in a manner that the reflection surface 403 faces the emission section 410. The reflection surface 403 has a rotationally symmetric shape around the optical axis 3, which serves as an axis of rotation, for example. The reflection surface 403 reflects the image light 411 emitted from the emission section 410, and emits the image light 411 toward the screen unit 420. The shape and the like of the reflection surface 403 are not limited. For example, the reflection surface 403 may be appropriately configured to radiate the image light 411 to a predetermined region of the screen unit 420.

The screen unit 420 includes a first HOE 430 and a second HOE 440. The first HOE 430 has a cylindrical shape, and is disposed around the optical axis 3. In other words, the first HOE 430 is disposed in a manner that the central axis of the cylindrical shape is substantially identical to the optical axis 3. In addition, the diameter of the first HOE 430 is set to a value similar to the diameter of the base 401, for example. Note that, the diameter, height, and the like of the first HOE 430 may be set appropriately.

The first HOE 430 includes a first surface 431 and a second surface 432. The first surface 431 serves as an outer surface of the cylindrical shape, and the second surface 432 serves as an inner surface of the cylindrical shape. In this embodiment, a reflective holographic optical element is used as the first HOE 430. The reflective holographic optical element diffuses and reflects light incident on the second surface 432. Therefore, the second surface 432 functions as a diffusion surface that inwardly diffuses and reflects light incident from the inner surface of the cylindrical shape at a certain incident angle. In this embodiment, the second surface 432 corresponds to an inner periphery of the cylindrical shape.

The second HOE 440 is disposed in a manner that the second HOE 440 surrounds the central axis 3 and faces the second surface 432 of the first HOE 430. In addition, the second HOE 440 is disposed in a manner that there is a predetermined interval between the second HOE 440 and the first HOE 430. Therefore, the cylindrical second HOE 440 has a smaller diameter than the first HOE 430. As described above, the screen unit 420 has a double-layered cylindrical shape in which the first HOE 430 is disposed outside and the second HOE 440 is disposed inside.

The second HOE 440 includes a third surface 441 and a fourth surface 442. The third surface 441 serves as an outer surface of the cylindrical shape, and the fourth surface 442 serves as an inner surface of the cylindrical shape. In this embodiment, a reflective holographic optical element is used as the second HOE 440. The reflective holographic optical element diffracts light incident on the third surface 441 toward the light incident direction. In addition, the second HOE 440 is appropriately configured in a manner that the third surface 441 has an optical function as a concave mirror. Therefore, the third surface 441 functions as a control surface that controls propagation directions of image light 411 and forms a virtual image of the second surface 432.

As illustrated in FIG. 16, the image light 411 emitted from the emission section 410 is incident on the reflection surface 403 of the reflective mirror 402. The image light 411 is reflected by the reflection surface 403, and is emitted toward the cylindrical screen unit 420. As described above, the emission section 410 and the reflective mirror 402 emits the image light 411 from the inside of the cylindrical shape toward the outside of the cylindrical shape. In this embodiment, the emission section includes the emission section 410 and the reflective mirror 402.

The image light 411 reflected by the reflection surface 403 is incident on the fourth surface 442 of the second HOE 440. The incident angles of the image light 411 incident on the fourth surface 442 deviate from an angular range having high diffraction efficiency on the second HOE 440 (see FIG. 8). Therefore, the image light 411 incident on the fourth surface 442 passes through the second HOE 440, and is emitted from the third surface 441 as it is.

The image light 411 that has passed through the second HOE 440 is incident on respective points on the second surface 432 of the first HOE 430. The second surface 432 diffuses and reflects the image light 411 that has been incident. In other words, the diffused image light 411 (diffused light 434) is emitted from the respective points of the second surface 432 toward the inside of the screen unit 420. As a result, a whole circumference image 433 is formed on the second surface 432 by using the diffused light 434 that goes inside from the respective points on the second surface 432. Thick lines in FIG. 16 and FIG. 17 schematically represent the whole circumference image 433.

The diffused light 434 that goes inside the screen unit 420 is incident on the third surface 441 of the second HOE 440. The third surface 441 reflects (diffracts) the diffused light 434 that has been incident, in a manner that virtual images of the respective points on the second surface 432 is formed. In other words, the third surface 441 outwardly emits the image light 411 that forms the virtual images. As a result, a cylindrical image is formed on an image formation plane 450 that is positioned inside the second HOE 440. The cylindrical image is a virtual image 451 of the whole circumference image 433. Thick dotted lines in FIG. 16 and FIG. 17 schematically represent the virtual image 451.

The image light 411 that forms the virtual image 451 passes through the first HOE 430, and is emitted toward the outside of the screen unit 420. This makes it possible for the observer (point of view 1) to visually recognize the cylindrical virtual image 451 (cylindrical aerial image) formed inside the screen unit 420.

As described above, it is possible to display the cylindrical aerial image in an internal space of the screen unit 420 as if the cylindrical aerial image were floating in the air, by using the double-layered cylindrical screen unit 420 including the first HOE 430 and the second HOE 440. This makes it possible to visually recognize the image display in the air regardless of reflection on the back surface, front surface, and the like of the screen unit 420. Therefore, it is possible to achieve excellent visual effects.

Note that, the shape and the like of the screen unit 420 are not limited. For example, it is possible to use a cuboid-tubular screen unit 420 having a polygonal cross section, a tubular screen unit 420 having an oval cross section, or the like. Alternatively, it is possible to appropriately configure a double-layered screen unit 420 having any cross section.

Figure 18A:
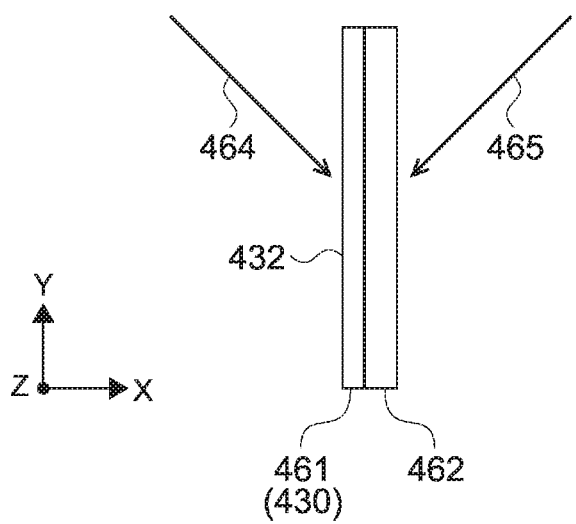
FIGS. 18A, 18B, and 18C are schematic diagrams illustrating a generation example of a screen unit.
Figure 18B:
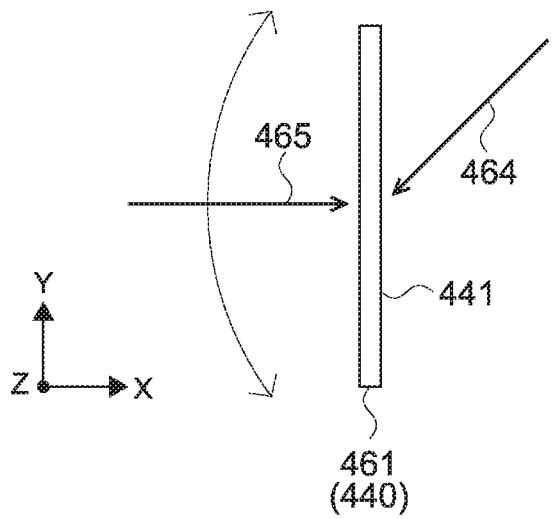
Figure 18C:
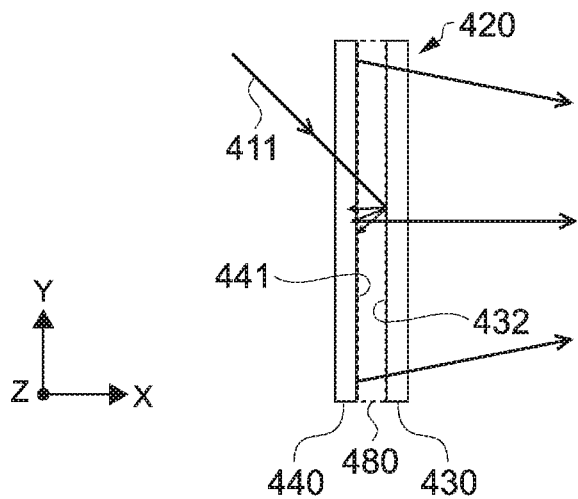

FIGS. 18A, 18B, and 18C are schematic diagrams illustrating a generation example of the screen unit 420. FIG. 18A is a schematic diagram illustrating a generation example of the first HOE 430. FIG. 18B is a schematic diagram illustrating a generation example of the second HOE 440. FIG. 18C is a schematic diagram illustrating a configuration example of the screen unit 420.

As illustrated in FIG. 18A, a hologram dry plate 461 and a diffuser plate 462 that are disposed in vicinity to each other are used for generating the first HOE 430. For example, diffused light is generated from object light 465 incident from the diffuser plate 462 side. Subsequently, an interference pattern of the diffused light that has been generated and reference light 464 incident from the hologram dry plate side is recorded on the hologram dry plate 461 (see FIG. 12). At this time, an incident angle of the reference light 464 is appropriately set for each exposure position in accordance with an incident angle of the image light 411 incident from the reflective mirror 402 (reflection surface 403) illustrated in FIG. 1, for example. Note that, with regard to the hologram dry plate 461, the surface on which the reference light 464 is incident serves as the second surface 432 (diffusion surface).

As illustrated in FIG. 18B, the second HOE 440 is generated by radiating the object light 465 to one surface of the hologram dry plate 461, radiating the reference light 464 to the other surface, and exposing the interference pattern. For example, by appropriately adjusting the incident angles of the object light 465 for respective exposure positions, it is possible to expose the interference pattern that functions as a concave mirror (see FIG. 7). Note that, with regard to the hologram dry plate 461, the surface on which the reference light 464 is incident serves as the third surface 441 (control surface).

As illustrated in FIG. 18C, in the screen unit 420, the first HOE 430 and the second HOE 440 are each held via transparent base material 480. For example, an outer surface of the cylindrical transparent base material 480 connects with the second surface 432 of the first HOE 430, and an inner surface of the transparent base material 480 connects with the third surface 441 of the second HOE 440. This makes it possible to easily configure the double-layered cylindrical screen unit 420.

Note that, the cylindrical screen unit 420 is not limited to a screen unit including the reflective first HOE 430 disposed outside and the reflective second HOE 440 disposed inside as illustrated in FIG. 16. For example, it is possible to configure a cylindrical screen unit 420 including a transmissive first HOE disposed inside and a transmissive second HOE disposed outside.

For example, a cylindrical first HOE is disposed inside the screen unit 420. The cylindrical first HOE transmits and diffuses the image light 411 incident from the reflective mirror 402 (reflection surface 403). In this case, the image light 411 incident on the inner periphery (diffusion surface) of the first HOE is emitted as diffused light from the outer periphery of the first HOE.

In addition, the second HOE is disposed in a manner that the second HOE surrounds the central axis 3 of the cylindrical shape and faces the outer periphery of the first HOE. In this case, an inner periphery (control surface) of the second HOE is appropriately configured in a manner that the inner periphery (control surface) has an optical function as a refractive lens that controls propagation directions of the diffused light 434 emitted from the outer periphery of the first HOE. This makes it possible to form a virtual image of an image formed on the diffused surface, and this makes it possible to display a cylindrical aerial image in the internal space of the screen unit 420. For example, it is possible to use such a configuration.

Figure 19:
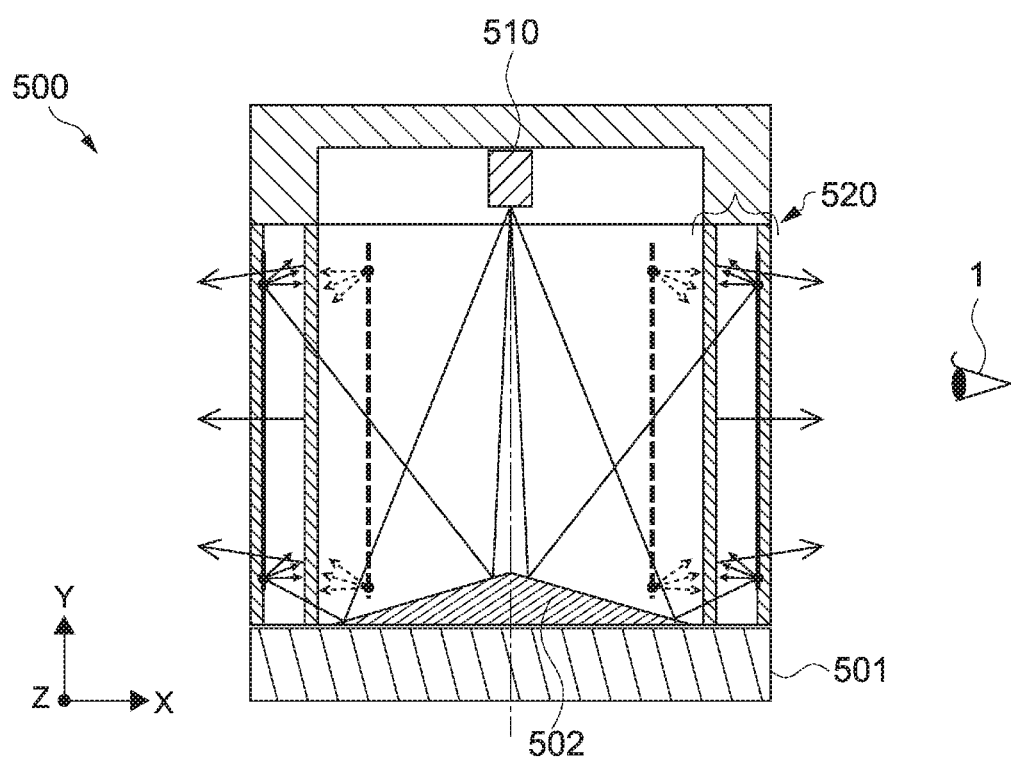
FIG. 19 is a schematic diagram illustrating another configuration example of the image display apparatus including a cylindrical screen unit.

FIG. 19 is a schematic diagram illustrating another configuration example of the image display apparatus including the cylindrical screen unit 420. In an image display apparatus 500, a reflective mirror 502 is provided on a base 501 disposed at a bottom of the apparatus, and an emission section 510 is disposed at an upper side of the apparatus. In addition, a double-layered screen unit 520 is provided between the reflective mirror 502 and the emission section 510. As described above, it is also possible to display a cylindrical aerial image even in the case where the emission section 510 is provided above and the reflective mirror 502 is provided below.

Note that, it is also possible to use a configuration of directly radiating the image light emitted from the emission section to the screen unit without using the reflective mirror. This makes it possible to reduce the number of parts and lower production cost. In addition, the configuration of radiating the image light to the screen unit and the like are not limited. For example, it is possible to use any optical system or the like that adjusts optical paths of emitted light.

In addition, the present technology is not limited to the case where the image light is radiated from the inside of the screen unit. For example, the image light may be radiated from the outside of the screen unit. For example, as illustrated in FIG. 1, the transmissive first HOE having a diffuser function is disposed outside the tubular screen unit, and the reflective second HOE having a function as a concave mirror is disposed inside the tubular screen unit. Alternatively, as illustrated in FIG. 13, the reflective first HOE having the diffusion function is disposed inside, and the transmissive second HOE having a lens function is disposed outside. For example, by using such a configuration, it is possible to display a cylindrical aerial image in the internal space of the screen unit even in the case where the image light is radiated from the outside of the screen unit.

Another Embodiment

The present technology is not limited to the above-described embodiment. Various other embodiments are possible.

In the above described embodiment, the diffusion function has been used as the optical function of the first HOE. According to the diffusion function, image light incident on the first HOE is emitted as diffused light. The optical function of the first HOE is not limited. In addition to the diffusion function, another optical function may be allocated.

For example, the first HOE may have an optical function as a field lens that controls diffusion directions of image light diffused at respective points. Here, the diffusion direction is a direction in which a diffused light beam is emitted at an emission angle that is an average angle of a predetermined angular range, among the diffused light emitted in the predetermined angular range, for example. Therefore, the diffusion direction is an index that represents main propagation directions of diffused light beams emitted in the predetermined angular range.

For example, the first HOE appropriately controls the diffusion directions in a manner that diffused light emitted from a periphery part (such as an upper end or a lower end) of the first HOE is radiated in a radiation range of the second HOE. In such a way, it is possible to provide the first HOE with a function as a field lens that collects the diffused light toward an irradiation target region. Note that, it is possible to achieve the field lens function by appropriately controlling the radiation directions and the like of the diffused light that is object light, when exposing the interference pattern with the diffusion function, for example (see FIG. 5 and FIG. 12).

By providing the field lens function, it is possible to control the diffused light and the like that is emitted toward the outside of the second HOE, for example, and it is possible to radiate the diffused light toward a desired region. In addition, it is not necessary to enlarge the side of the second HOE than the first HOE, and it is possible to reduce production cost and the like of the apparatus.

In the above-described embodiments, the first HOE and the second HOE are configured by using single layer holograms capable of diffracting laser light (image light) having a predetermined wavelength. The present technology is not limited thereto. The first HOE and the second HOE may have stacked structures corresponding to respective wavelengths of R, G, and B.

For example, in a way similar to the generation example of the second HOE 40 described with reference to FIG. 7 and the like, three types of holograms that are respectively exposed to laser light of red R, green G, and blue B are created. The second HOE is configured by stacking the three types of holograms. In addition, for example, holograms corresponding to respective wavelengths of R, G, and B are created in a way similar to the generation example of the first HOE described with reference to FIG. 5 and the like, and the first HOE is configured by stacking the holograms.

This makes it possible to diffract laser light having respective wavelengths of R, G, and B, and this makes it possible to display a virtual image such as a color image. In addition, the method for configuring the stacked structures and the like are not limited. For example, a reflective HOE having strong wavelength selectivity may have a stacked structure, and a transmissive HOE may have a single layer.

In the first and second embodiments, the second HOEs 40 and 240 (the third surfaces 41 and 241) having the optical functions as the concave mirrors have been used. Instead of the second HOEs 40 and 240, it is possible to use a holographic optical element having an optical function as a plane mirror, as the second HOE.

In this case, a virtual image is formed behind the screen unit by substantially the same distance as the interval between the first HOE and the second HOE. In addition, the size of the virtual image is the same as the size of an image displayed on the first HOE. As described above, it is possible to display the image as if the image were floating in the air, even in the case where the second HOE functions as the plane mirror.

In the third embodiment, the reflective first HOE 330 and the transmissive second HOE 340 are used. Instead of the reflective first HOE 330, for example, it is possible to use the transmissive first HOE 30 described with reference to FIG. 1. In this case, the image light emitted from the back side of the screen unit is diffused and transmitted by the first HOE, and is incident on the second HOE. The second HOE functions as a refractive lens, and a virtual image of the image displayed on the first HOE is formed. As described above, it is possible to display the image as if the image were floating in the air, even in the case where the first HOE and the second HOE are transmissive.

In the above-described embodiment, the diffusion function and the optical functions such as the lens function are achieved through diffraction caused by the holographic optical elements (first and second HOEs). The present technology is not limited thereto. It is possible to appropriately use another optical element or the like that is capable of achieving the diffusion function and the optical functions such as the lens function.

For example, it is possible to configure a transparent lens screen or the like having incident angle selectivity, by combining a Fresnel refractive surface with a half mirror. In this case, it is possible to achieve a lens function and the like through refraction through the Fresnel lens and reflection on the half mirror. In addition, it is also possible to achieve the diffusion function by using a diffusion film or the like that diffuses light incident at a predetermined incident angle.

In addition, for example, it is possible to combine a holographic optical element having the diffusion function with another optical element having the lens function. Of course, it is also possible to combine a holographic optical element having the lens function with another optical element having the diffusion function. In addition, the types, combinations, and the like of optical elements for achieving the optical functions to form a virtual image are not limited.

Out of the features according to the present technology described above, at least two features can be combined. That is, the various features described in the embodiments may be arbitrarily combined irrespective of the embodiments. Further, various effects described above are merely examples and are not limited, and other effects may be exerted.

Note that, the present technology may also be configured as below.

(1) An image display apparatus including:
a first transparent member that includes a diffusion surface for diffusing light incident on respective points;
a second transparent member that includes a control surface and that is integrated with the first transparent member, the control surface being disposed in a manner that the control surface faces the diffusion surface, controlling propagation directions of light diffused at the respective points on the diffusion surface, and forming a virtual image of the diffusion surface; and
an emission section that emits image light to the diffusion surface.

(2) The image display apparatus according to (1),
in which the control surface controls the propagation directions at least by diffracting, refracting, or reflecting the diffused light.

(3) The image display apparatus according to (1) or (2),
in which the control surface collects at least a portion of the diffused light in a focus of the control surface.

(4) The image display apparatus according to any one of (1) to (3),
in which the diffusion surface diffuses the light incident on the respective points on the diffusion surface at predetermined incident angles.

(5) The image display apparatus according to (4),
in which the diffusion surface diffuses the light in a predetermined angular range.

(6) The image display apparatus according to (5),
in which the predetermined angular range is set on the basis of angular dependency of diffraction efficiency of the control surface.

(7) The image display apparatus according to any one of (1) to (6),
in which at least one of the first transparent member or the second transparent member is a holographic optical element.

(8) The image display apparatus according to (7), in which
the first transparent member is a reflective holographic optical element, and
the diffusion surface diffuses and reflects the light incident on the respective points.

(9) The image display apparatus according to (7), in which
the first transparent member is a transmissive holographic optical element, and
the diffusion surface diffuses and transmits the light incident on the respective points.
(10) The image display apparatus according to any one of (7) to (9), in which
the second transparent member is a reflective holographic optical element, and
the control surface has an optical function as a plane mirror or a concave mirror.
(11) The image display apparatus according to any one of (7) to (9), in which
the second transparent member is a transmissive holographic optical element, and
the control surface has an optical function as a lens.
(12) The image display apparatus according to any one of (3) to (11),
in which the first transparent member and the second transparent member are disposed in a manner that the first transparent member and the second transparent member are substantially parallel to each other at a shorter interval than a focal length of the control surface.
(13) The image display apparatus according to any one of (1) to (12),
in which the diffusion surface has an optical function as a field lens that controls diffusion directions of the light diffused at the respective points.
(14) The image display apparatus according to any one of (1) to (13),
in which the first transparent member and the second transparent member are held via transparent material interposed between the first transparent member and the second transparent member.
(15) The image display apparatus according to any one of (1) to (14),
in which the first transparent member and the second transparent member have stacking structures corresponding to respective wavelengths of R, G, and B.
(16) The image display apparatus according to any one of (1) to (15),
in which the emission section includes a laser light source.
(17) The image display apparatus according to any one of (1) to (16), in which
the first transparent member has a cylindrical shape, and
the second transparent member is disposed in a manner that the second transparent member surrounds a central axis of the cylindrical shape and faces at least one of an inner periphery or an outer periphery of the cylindrical shape.
(18) The image display apparatus according to (17),
in which the emission section emits the image light from an inside of the cylindrical shape to an outside of the cylindrical shape.
(19) An image display element including:
a first transparent member that includes a diffusion surface for diffusing light incident on respective points; and
a second transparent member that includes a control surface and that is integrated with the first transparent member, the control surface being disposed in a manner that the control surface faces the diffusion surface, controlling propagation directions of light diffused at the respective points on the diffusion surface, and forming a virtual image of the diffusion surface.

REFERENCE SIGNS LIST

O, O' focus
θ incident angle
Φ predetermined angular range
1 point of view
2, 3 optical axis
10, 210, 310, 410, 510 emission section
11, 211, 311, 411 image light
20, 220, 320, 420, 520 screen unit
30, 230, 330, 430 first HOE
31, 231, 331, 431 first surface
32, 232, 332, 432 second surface
33a to 33e, P, 333a, 333b incident point
40, 240, 340, 440 second HOE
41, 241, 341, 441 third surface
34, 234, 334, 434 diffused light
50, 250, 350, 450 image formation plane
51a to 51e, 251, 351, 451 virtual image
80, 480 transparent base material
100, 200, 300, 400, 500 image display apparatus

The invention claimed is:
1. An image display apparatus comprising:
a first holographic optical element that includes a diffusion surface;
a light source configured to emit light to the diffusion surface, wherein the first holographic optical element is configured to diffuse the emitted light incident on respective points on the diffusion surface; and
a second holographic optical element that includes a control surface, wherein
the second holographic optical element is integrated with the first holographic optical element,
the control surface faces the diffusion surface, and
the control surface is configured to:
control propagation directions of the light diffused at the respective points on the diffusion surface; and
form a virtual image of the diffusion surface.
2. The image display apparatus according to claim 1, wherein the control surface is further configured to control the propagation directions based on at least one of diffraction of the diffused light, refraction of the diffused light, or reflection of the diffused light.
3. The image display apparatus according to claim 1, wherein the control surface is further configured to collect at least a portion of the diffused light in a focus of the control surface.
4. The image display apparatus according to claim 1, wherein the diffusion surface is further configured to diffuse the light incident on the respective points on the diffusion surface at a plurality of specific incident angles.
5. The image display apparatus according to claim 4, wherein the diffusion surface is further configured to diffuse the light in a specific angular range.
6. The image display apparatus according to claim 5, wherein the specific angular range is set based on angular dependence of diffraction efficiency of the control surface.
7. The image display apparatus according to claim 1, wherein
the first holographic optical element is a reflective holographic optical element, and
the diffusion surface is further configured to reflect the light incident on the respective points.

8. The image display apparatus according to claim 1, wherein
the first holographic optical element is a transmissive holographic optical element, and
the diffusion surface is further configured to transmit the light incident on the respective points.

9. The image display apparatus according to claim 1, wherein
the second holographic optical element is a reflective holographic optical element, and
the control surface has an optical function as a plane mirror or a concave mirror.

10. The image display apparatus according to claim 1, wherein
the second holographic optical element is a transmissive holographic optical element, and
the control surface has an optical function as a lens.

11. The image display apparatus according to claim 3, wherein the first holographic optical element is substantially parallel to the second holographic optical element at an interval shorter than a focal length of the control surface.

12. The image display apparatus according to claim 1, wherein
the diffusion surface has an optical function as a field lens, and
the field lens is configured to control diffusion directions of the light diffused at the respective points.

13. The image display apparatus according to claim 1, wherein
the first holographic optical element and the second holographic optical element are bonded via a transparent material, and
the transparent material is between the first holographic optical element and the second holographic optical element.

14. The image display apparatus according to claim 1, wherein each of the first holographic optical element and the second holographic optical element includes a plurality of stacking structures corresponding to respective wavelengths of R, G, and B.

15. The image display apparatus according to claim 1, wherein the light source includes a laser light source.

16. The image display apparatus according to claim 1, wherein
the first holographic optical element has a cylindrical shape, and
the second holographic optical element surrounds a central axis of the cylindrical shape and faces at least one of an inner periphery of the cylindrical shape or an outer periphery of the cylindrical shape.

17. The image display apparatus according to claim 16, wherein the light source is further configured to emit the light from an inside of the cylindrical shape to an outside of the cylindrical shape.

18. An image display element, comprising:
a first holographic optical element that includes a diffusion surface, wherein the first holographic optical element is configured to diffuse for diffusing light incident on respective points on the diffusion surface; and
a second holographic optical element that includes a control surface, wherein
the second holographic optical element is integrated with the first holographic optical element,
the control surface faces the diffusion surface,
the control surface is configured to:
control propagation directions of the light diffused at the respective points on the diffusion surface; and
form a virtual image of the diffusion surface, and a light source emits the light to the diffusion surface.

* * * * *